(12) United States Patent
Raz et al.

(10) Patent No.: US 7,613,212 B1
(45) Date of Patent: Nov. 3, 2009

(54) CENTRALIZED CLOCK SYNCHRONIZATION FOR TIME DIVISION MULTIPLEXED TRAFFIC TRANSPORTED OVER ETHERNET NETWORKS

(75) Inventors: Yaron Raz, Ramot Meir (IL); Pavel Hardak, Lod (IL); Amir Lahat, Cupertino, CA (US); Alex Arnon, Tel Aviv (IL); Gila Klein, Rosh Ha'ain (IL)

(73) Assignee: Atrica Israel Ltd., Hod Hasharon (IL)

( * ) Notice: Subject to any disclaimer, the term of this patent is extended or adjusted under 35 U.S.C. 154(b) by 1147 days.

(21) Appl. No.: 10/459,217

(22) Filed: Jun. 10, 2003

(51) Int. Cl.
*H04J 3/06* (2006.01)
(52) U.S. Cl. .................. 370/510; 370/512
(58) Field of Classification Search .............. 370/504, 370/503, 358, 509, 511, 512, 516, 518, 510
See application file for complete search history.

(56) References Cited

U.S. PATENT DOCUMENTS

| | | | | |
|---|---|---|---|---|
| 5,361,277 A | | 11/1994 | Grover | 375/356 |
| 5,535,217 A | * | 7/1996 | Cheung et al. | 709/248 |
| 5,579,513 A | * | 11/1996 | Strohmer | 713/600 |
| 5,689,688 A | * | 11/1997 | Strong et al. | 713/375 |
| 5,852,604 A | * | 12/1998 | Cooley et al. | 370/324 |
| 5,867,564 A | * | 2/1999 | Bhusri | 379/111 |
| 5,958,060 A | * | 9/1999 | Premerlani | 713/400 |
| 6,308,280 B1 | * | 10/2001 | Joseph et al. | 713/400 |
| 6,643,791 B1 | | 11/2003 | Teodorescu | 713/500 |
| 6,741,952 B2 | * | 5/2004 | Eidson | 702/187 |
| 6,744,697 B2 | * | 6/2004 | Mitra et al. | 368/46 |
| 6,751,573 B1 | * | 6/2004 | Burch | 702/178 |
| 6,765,917 B1 | * | 7/2004 | Jaakkola et al. | 370/395.62 |
| 6,775,300 B2 | | 8/2004 | Kuo | 370/503 |
| 6,975,653 B2 | * | 12/2005 | Eidson | 370/503 |
| 6,999,787 B2 | * | 2/2006 | Zschintzsch | 455/550.1 |
| 7,058,838 B2 | * | 6/2006 | Xu | 713/400 |
| 7,151,945 B2 | * | 12/2006 | Myles et al. | 455/502 |
| 7,200,158 B2 | * | 4/2007 | Gustin | 370/509 |
| 7,289,538 B1 | * | 10/2007 | Paradise et al. | 370/497 |
| 7,295,559 B2 | * | 11/2007 | Reesor | 370/395.62 |

(Continued)

FOREIGN PATENT DOCUMENTS

EP          0501652 B1  *   1/1999

(Continued)

OTHER PUBLICATIONS

Analysis of digital tanlock loop with adaptive filtering; Tervo, R. Enriquez, R.; Dept. of Electr. Eng., New Brunswick Univ., Fredericton, NB; This paper appears in: Communications, Computers and Signal Processing, 1993., IEEE Pacific Rim Conference on Publication Date: May 19-21, 1993 vol. 1, On pp. 5-8 vol. 1.*

(Continued)

*Primary Examiner*—Ayaz Sheikh
*Assistant Examiner*—Salman Ahmed
(74) *Attorney, Agent, or Firm*—Zaretsky Patent Group PC; Howard Zaretsky

(57) ABSTRACT

A centralized clock distribution mechanism for synchronous TDM communications traffic transported over asynchronous networks such as Ethernet networks. The centralized clocking mechanism of the present invention distributes a high accuracy central clock source to a plurality of CES modules over an Ethernet network. Clock synchronization information based on a high quality clock reference source is distributed to circuit emulation service (CES) modules in the network. CES modules receive the clock synchronization information and use it to reconstruct a local clock. A plurality of clock distributors provide clock redundancy whereby each CES module selects the best clock source to use in reconstructing the local clock.

42 Claims, 10 Drawing Sheets

U.S. PATENT DOCUMENTS

| | | | |
|---|---|---|---|
| 7,379,480 | B2* | 5/2008 | Balasubramanian et al. 370/516 |
| 2001/0053193 | A1* | 12/2001 | Mitra et al. ................. 375/356 |
| 2002/0186716 | A1* | 12/2002 | Eidson ........................ 370/503 |
| 2003/0158706 | A1* | 8/2003 | Eidson ........................ 702/187 |
| 2003/0169776 | A1* | 9/2003 | Reesor ....................... 370/503 |
| 2003/0235216 | A1* | 12/2003 | Gustin ........................ 370/509 |
| 2004/0062278 | A1* | 4/2004 | Hadzic et al. .............. 370/503 |
| 2004/0117682 | A1* | 6/2004 | Xu ............................. 713/400 |
| 2004/0141526 | A1* | 7/2004 | Balasubramanian et al. 370/503 |
| 2004/0203951 | A1* | 10/2004 | Mazzara et al. ............ 455/466 |
| 2006/0153182 | A1* | 7/2006 | Lockridge et al. ........... 370/389 |
| 2007/0091934 | A1* | 4/2007 | Myles et al. ................ 370/503 |

FOREIGN PATENT DOCUMENTS

| | | | |
|---|---|---|---|
| WO | WO9806194 | * | 2/1998 |
| WO | WO03075488 A2 | * | 9/2003 |

OTHER PUBLICATIONS

A new method for clock distribution; Grover, W.D.; Network & Syst. Res., Telecommun. Res. Lab., Edmonton, Alta.; This paper appears in: Circuits and Systems I: Fundamental Theory and Applications, IEEE Transactions on Publication Date: Feb. 1994 vol. 41, Issue: 2 On pp. 149-160.*

High-quality clock distribution method with fast-restoration forsynchronous ring networks; Uematsu, Y. Tomizawa, M. Matsumura, K. Matsuoka, S. Hagimoto, K.; NTT Opt. Network Syst. Labs., Japan; This paper appears in: Communications.*

U.S. Appl. No. 10/218,284, filed Aug. 14, 2002, Paradise et al.

Stein et al., "TDM over IP", draft-anavi-tdmoip-05.txt, Mar. 2003.

Malis et al., SONET/SDH Circuit Emulation over Packet (CEP), draft-ietf-pwe3-sonet-01.txt, Jan. 2003.

Pate et al., "TDM Service Specification for Pseudo-Wire Emulation Edge to Edge (PWE3)", draft-ietf-pwe3-sonet-vt-00.txt, Aug. 2002.

Johnson, "TDM Circuit Emulation over Packet (CEP-TDM)", draft-johnson-pwe3-tdm-00.txt, Feb. 2003.

Malis et al., "Unstructured Circuit Emulation over Packet (U-CEP)", draft-malis-pwe3-unstruct-00.txt, Sep. 2002.

Vainshtein et al., "TDM Circuit Emulation Service over Packet Switched Network (CESoPSN)", draft-vainshtein-cesopsn-03.txt, Jun. 2002.

Schulzrinne et al., "RTP: A Transport Protocol for Real-Time Applications", RFC 1889, Jan. 1996.

R. Noro, M. Hamdi, J. P. Hubaux, "Circuit Emulation over IP Networks," Proceedings of Protocols for High-Speed Networks VI, Salem, Mass., Aug. 1999, pp. 187-201.

* cited by examiner

CENTRALIZED CLOCK SYNCHRONIZATION FOR TIME DIVISION MULTIPLEXED TRAFFIC TRANSPORTED OVER ETHERNET NETWORKS

REFERENCE TO RELATED APPLICATIONS

This application is related to U.S. application Ser. No. 10/218,284 filed Aug. 14, 2002, now U.S. Pat. No. 7,289,538, entitled "Clock Reconstruction For Time Division Multiplexed Traffic Transported Over Asynchronous Ethernet Networks," incorporated herein by reference in its entirety.

FIELD OF THE INVENTION

The present invention relates to the field of data communications and more particularly relates to a mechanism for providing Time Division Multiplexing (TDM) synchronization from a centralized clock source location to a plurality of nodes over an Ethernet network.

BACKGROUND OF THE INVENTION

The growth in demand for telecommunication services is increasing at an ever-quickening pace. The majority of the demand is being driven by the explosion in the use of the Internet and a steady stream of new applications being introduced which further increase the demand for increased bandwidth. Currently, a large portion of the Internet traffic is still carried by circuit switched transport facilities. In the case of Metropolitan Area Networks (MANs), most of the traffic is transported over SONET/SDH based networks most of which were originally resigned for voice traffic. With time, more and more customers are using the networks for transporting data rather than voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have begun to migrate towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET), their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of relatively low-speed, circuit-oriented network access technologies.

The use of Ethernet, both optical and electrical based, is increasing in carrier networks due to advantages of Ethernet and particular Optical Ethernet, namely its ability to scale from low speeds to very high rates and its commodity-oriented nature. With the rapid increase in the demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

A problem arises, however, how to transfer legacy TDM traffic over an asynchronous Ethernet network and particularly, how to extract and reconstruct the TDM clock from the received data at the other side. It is important that the clock used at the receive side be traceable to the clock used at the transmitter. Better still, it is desirable that the clocks on either end of a connection be traceable to the centralized clock source and not just to each other. The clock at the transmitter side can be provided from an external source, a clock distribution network or from SONET/SDH equipment.

Circuit Emulation Service (CES) modules are used in Ethernet networks to transport TDM streams over asynchronous networks. In order to transmit TDM traffic, CES modules require some form of clocking. Typically several clocking options include: (1) an external clock input from, for example, a E1 or T1 connection in accordance with specification G.703; (2) line clock which is recovered from a E1/T1 or STM port (i.e. loop timing); and (3) a clock derived from an internal free running local oscillator.

From the standpoint of a service provider, in addition to basic connectivity, one of the services typically provided is an accurate clock source for customers to use. The clock source provided should be of high enough quality that customers can utilize the clock for transmission of the data from their customer equipment to a remote destination. A clock derived from the local oscillator in a CES module typically does not have sufficient accuracy to meet the necessary requirements.

Considering a connection between two CES modules, on the CES module on one side of the connection is configured as a master and placed in free running mode while the CES module on the other end of the connection synchronizes to it. The accuracy of the clock on both ends of the connection, however, is limited to the accuracy of the local oscillator in the CES module acting as the master.

The quality of the clock source used by the CES modules in the network can be greatly increased by use of a highly accurate centralized clock. Thus, there is a need for a mechanism of distributing a high accuracy clock to a plurality of CES modules. The mechanism should be able to distribute the clock to multiple CES modules over an asynchronous Ethernet network.

SUMMARY OF THE INVENTION

The present invention comprises a centralized clock distribution mechanism for synchronous TDM communications traffic that is transported over asynchronous networks such as Ethernet networks. The TDM synchronous traffic comprises any type of synchronous data streams such SONET/SDH/PDH data streams including commonly used T1, E1, etc. The present invention is suitable for use wherever synchronous TDM traffic must be transported over asynchronous networks. In particular, the invention is applicable in edge switches in Metropolitan Area Networks (MANs) that comprise some form of Circuit Emulation Service (CES) adapted to segment or encapsulate TDM traffic and to transport the synchronous TDM data across the Ethernet network.

The centralized clocking mechanism of the present invention is operative to distribute a high accuracy central clock source to a plurality of CES modules over an Ethernet network. The mechanism permits CES modules to receive synchronization information from a clock source regardless of the amount and type of TDM traffic sent to or received by the CES modules. Thus, CES modules are synchronized even if no TDM traffic is sent to or received by a CES module.

The clock distribution mechanism is operative to generate a network timestamp based on a high quality clock source. This network timestamp and other clock information are placed in a clock synchronization packet which is then distributed to multiple CES modules in the network. A network may comprise a plurality of clock distributors in order to provide clock redundancy and to improve clock reliability.

Clock connections from each clock distributor are established to the CES modules in the network. Each CES module is configured to select the best connection from among all its clock connections based on a clock quality indication and to use the clock synchronization information corresponding thereto to reconstruct a local clock. Since all CES modules perform the same clock reconstruction mechanism, and receive the same clock synchronization information, their reconstructed clocks are all synchronized to each other. The reconstructed local clock is then used to transmit and receive TDM bitstreams. Each clock distribution unit monitors the quality of the clock it is receiving from its clock reference and marks this in the clock synchronization packet. A CES module can thus choose the best clock source to use at any given point in time.

It is important to also note that the invention is not limited by the type of asynchronous network in use, the PHY layer, the type of signaling in use or by whether provisioning is based on signaling or performed in the management plane. The invention is applicable to other asynchronous networks as well.

Note also that the invention is suited for implementation in hardware such as a network processor (which may comprise a network-processor chip, an FPGA, an ASIC, etc.), adapted to implement the TDM clock reconstruction mechanism of the present invention, software or a combination of hardware and software. In one embodiment, a network device comprising a processor, memory, etc. is operative to execute software adapted to perform the clock distribution and CES receiver mechanisms of the present invention.

There is thus provided in accordance with the invention, a system for distributing a master clock source over an Ethernet network comprising a clock distribution unit comprising means for generating a network timestamp derived from the master clock source, means for inserting the network timestamp into a clock synchronization Ethernet packet, means for transmitting the clock synchronization Ethernet packet to a plurality of circuit emulation service (CES) modules, each CES module comprising means for receiving the clock synchronization Ethernet packets and extracting the network timestamp therefrom, means for generating a local timestamp utilizing a reconstructed clock generated by a local clock source, a filter adapted to track differences between the local clock and the master clock source as a function of the local timestamp and the network timestamp, and to generate a clock control signal in response thereto and a clock generator comprising the local clock source and adapted to output the reconstructed clock having a frequency determined in accordance with the clock control signal.

There is also provided in accordance with the invention, a method of distributing a master clock source to a plurality of circuit emulation service (CES) modules over an Ethernet network, the method comprising the steps of generating a network timestamp derived from the master clock source, inserting the network timestamp into a clock synchronization Ethernet packet, transmitting the clock synchronization Ethernet packet to a plurality of circuit emulation service (CES) modules, receiving the clock synchronization Ethernet packets and extracting the network timestamp therefrom, generating a local timestamp utilizing a reconstructed clock generated by a local clock source, tracking differences between the local clock and the master clock source as a function of the local timestamp and the network timestamp, and to generate a clock control signal in response thereto and generating the reconstructed clock utilizing the local clock source and having a frequency determined in accordance with the clock control signal.

There is further provided in accordance with the invention, a method of distributing a clock to a plurality of circuit emulation service (CES) modules over an Ethernet based network, the method comprising the steps of generating a first network timestamp from a primary master clock source, establishing first connections from the primary clock source to each CES module to be synchronized, the first connections adapted to carry clock synchronization traffic only, transmitting first clock synchronization Ethernet packets comprising the first network timestamp over the connections to the CES modules to be synchronized, generating a second network timestamp from a backup master clock source, establishing second connections from the secondary clock source to each CES module to be synchronized, the second connections adapted to carry clock synchronization traffic only and transmitting second clock synchronization Ethernet packets comprising the second network timestamp over the connections to the CES modules to be synchronized.

There is also provided in accordance with the invention, a system for synchronizing a plurality of circuit emulation service (CES) modules over an Ethernet network comprising a primary clock distribution unit comprising means for generating a first network timestamp derived from a primary master clock source, means for generating a first clock quality indication for indicating the quality of the primary master clock source, means for transmitting first clock synchronization Ethernet packets containing the first network timestamp and the first clock quality indication to the plurality of circuit emulation service (CES) modules over the Ethernet network, a backup clock distribution unit comprising means for generating a second network timestamp derived from a backup master clock source, means for generating a second clock quality indication for indicating the quality of the backup master clock source, means for transmitting second clock synchronization Ethernet packets containing the second network timestamp and second clock quality indication to the plurality of circuit emulation service (CES) modules over the Ethernet network, each CES module comprising means for receiving the first clock synchronization Ethernet packets and extracting the first network timestamp and first clock quality indication therefrom, means for receiving the second clock synchronization Ethernet packets and extracting the second network timestamp and second clock quality indication therefrom, selection means for selecting either the first network timestamp or the second network timestamp in accordance with the first clock quality indication and the second clock quality indication, means for generating a local timestamp utilizing a reconstructed clock generated by a local clock source, a filter adapted to track differences between the local clock and one of the master clock sources as a function of the local timestamp and the selected network timestamp, and to generate a clock control signal in response thereto and a clock generator comprising the local clock source and adapted to output the reconstructed clock having a frequency determined in accordance with the clock control signal.

There is further provided in accordance with the invention, a circuit emulation services (CES) module comprising means for receiving first clock synchronization Ethernet packets from a primary clock distribution unit coupled to a primary master clock source and extracting a first network timestamp and first clock quality indication therefrom, means for receiving second clock synchronization Ethernet packets from a backup clock distribution unit coupled to a backup master clock source and extracting a second network timestamp and second clock quality indication therefrom, selecting a preferred network timestamp based on the first clock quality indication and the second clock quality indication, means for generating a local timestamp utilizing a reconstructed clock generated by a local clock source, a filter adapted to track differences between the local clock and either the primary master clock source or the backup master clock source as a function of the local timestamp and the selected network timestamp, and to generate a clock control signal in response thereto and a clock generator comprising the local clock source and adapted to output the reconstructed clock having a frequency determined in accordance with the clock control signal.

There is also provided in accordance with the invention, an edge switch for use in an Ethernet based network comprising a plurality of user ports for interfacing the edge switch to one or more users, a plurality of network ports for interfacing the edge switch to one or more communication links, a packet processor comprising ingress packet processing means and egress packet processing means, a circuit Emulation Services (CES) module comprising a method of clock distribution to a plurality of circuit emulation service (CES) modules over an Ethernet based network, the method comprising the steps of generating a first network timestamp from a primary master clock source, establishing first connections from the primary clock source to each CES module to be synchronized, the first connections adapted to carry clock synchronization traffic only, transmitting first clock synchronization Ethernet packets comprising the first network timestamp over the connections to the CES modules to be synchronized, generating a second network timestamp from a backup master clock source, establishing second connections from the secondary clock source to each CES module to be synchronized, the second connections adapted to carry clock synchronization traffic only and transmitting second clock synchronization Ethernet packets comprising the second network timestamp over the connections to the CES modules to be synchronized.

There is further provided in accordance with the invention, an edge switch for use in an Ethernet based network comprising a plurality of user ports for interfacing the edge switch to one or more users, a plurality of network ports for interfacing the edge switch to one or more communication links, a packet processor comprising ingress packet processing means and egress packet processing means, a circuit Emulation Services (CES) module comprising means for receiving first clock synchronization Ethernet packets from a primary clock distribution unit coupled to a primary master clock source and extracting a first network timestamp and first clock quality indication therefrom, means for receiving second clock synchronization Ethernet packets from a backup clock distribution unit coupled to a backup master clock source and extracting a second network timestamp and second clock quality indication therefrom, selecting a preferred network timestamp based on the first clock quality indication and the second clock quality indication, means for generating a local timestamp utilizing a reconstructed clock generated by a local clock source, a filter adapted to track differences between the local clock and either the primary master clock source or the backup master clock source as a function of the local timestamp and the selected network timestamp, and to generate a clock control signal in response thereto and a clock generator comprising the local clock source and adapted to output the reconstructed clock having a frequency determined in accordance with the clock control signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
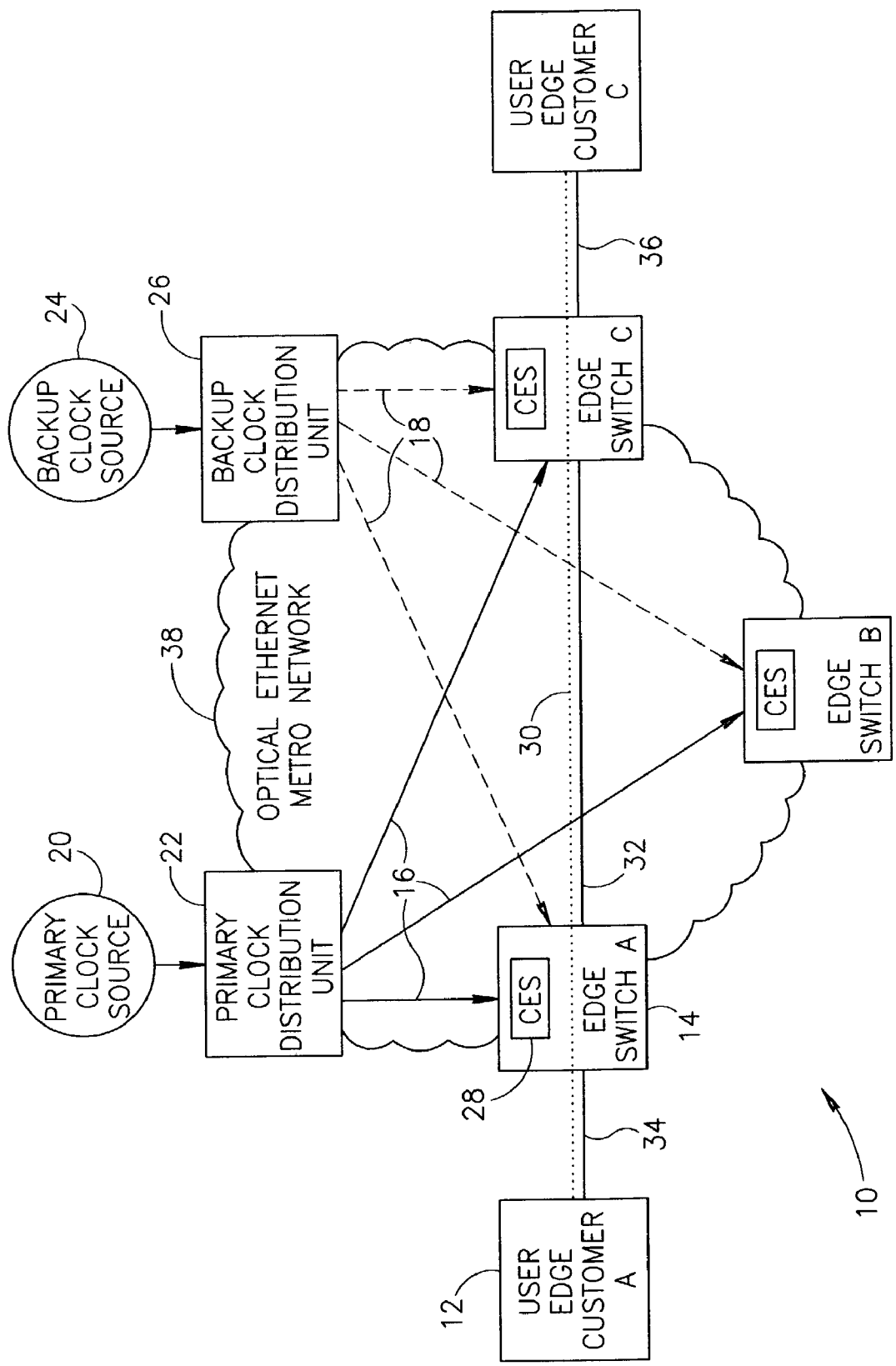
FIG. 1 is a block diagram illustrating an example optical Ethernet network comprising a plurality of clock distribution units and a plurality of switches having Circuit Emulation Services (CES) modules incorporating the clock synchronization scheme of the present invention.

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CES | Circuit Emulation Service |
| CPU | Central Processing Unit |
| CSIX | Common Switch Interface |
| DAC | Digital to Analog Converter |
| DAT | Digital Audio Tape |

-continued

| Term | Definition |
| --- | --- |
| DSL | Digital Subscriber Line |
| DSP | Digital Signal Processor |
| DTLL | Digital Time Locked Loop |
| DVD | Digital Versatile Disk |
| EEPROM | Electrically Erasable Programmable Read Only Memory |
| EPROM | Erasable Programmable Read Only Memory |
| FDDI | Fiber Distributed Data Interface |
| FE | Fast Ethernet |
| FPGA | Field Programmable Gate Array |
| GE | Gigabit Ethernet |
| IIR | Infinite Impulse Response |
| IP | Internet Protocol |
| ISP | Internet Service Provider |
| LAN | Local Area Network |
| LIU | Line Interface Unit |
| LSR | Least Squares Regression |
| MAC | Media Access Control |
| MAN | Metropolitan Area Network |
| MPLS | Multi-Protocol Label Switching |
| NIC | Network Interface Card |
| NMS | Network Management System |
| PC | Personal Computer |
| PCM | Pulse Code Modulation |
| PDH | Plesiochronous Digital Hierarchy |
| PM | Performance Monitoring |
| PPE | Packet Processing Engine |
| RAM | Random Access Memory |
| ROM | Read Only Memory |
| RPR | Resilient Packet Ring |
| SDH | Synchronous Digital Hierarchy |
| SONET | Synchronous Optical Network |
| STM | Synchronous Transport Module |
| TDM | Time Division Multiplexing |
| VCO | Voltage Controlled Oscillator |
| VCXO | Voltage Controlled Crystal Oscillator |
| VLAN | Virtual Local Area Network |
| WAN | Wide Area Network. |

DETAILED DESCRIPTION OF THE INVENTION

The present invention comprises a centralized clock distribution mechanism for synchronous TDM communications traffic that is transported over asynchronous networks such as Ethernet networks. The TDM synchronous traffic comprises any type of synchronous data streams such SONET/SDH/PDH data streams including commonly used T1, E1, etc. The present invention is suitable for use wherever synchronous traffic must be transported over asynchronous networks. In particular, the invention is applicable in edge switches in Metropolitan Area Networks (MANs) that comprise some form of Circuit Emulation Service (CES) adapted to segment or encapsulation TDM traffic and to transport the synchronous TDM data across the Ethernet network.

The centralized clocking mechanism of the present invention is operative to distribute a high accuracy central clock source to a plurality of CES modules over an Ethernet network. The mechanism permits CES modules to receive synchronization from a clock source regardless of any TDM traffic sent to or received by the CES modules. Thus, CES modules are synchronized even if no TDM traffic is sent to or received by a CES module.

An example embodiment is provided to illustrate the clock distribution mechanism of the present invention. It is not intended, however, that the invention be limited to the configurations and embodiments described herein. It is appreciated that one skilled in the networking, electrical and/or software arts may apply the principles of the present invention to numerous other types of networking devices and network configurations as well, including other types of synchronous data streams and asynchronous transport networks without departing from the spirit and scope of the invention.

A block diagram illustrating an example optical Ethernet network comprising a plurality of clock distribution units and a plurality of switches having Circuit Emulation Services (CES) modules incorporating the clock synchronization scheme of the present invention is shown in FIG. 1. The example network, generally referenced 10, comprises an asynchronous network 38 such as an optical based Ethernet metro network (MAN) which is used to transport synchronous data such as T1/E1 time division multiplexed (TDM) data. The network comprises a plurality of edge switches 14 comprising Circuit Emulation Services (CES) modules 28, user edge devices 12, a primary clock distribution unit 22 coupled to a first clock source 20, a backup clock distribution unit 26 coupled to a second clock source 24.

In operation, a connection (dotted line 30) is established between customer A connected to edge switch A via uplink 34 and customer C connected to edge switch C via uplink 36. All CES modules, i.e. edge switches A, B and C, receive synchronization clock information from multiple clock sources. The CES modules select a preferred clock source based on several factors and use it to generate a reconstructed clock. The reconstructed clock is then used in the transmission of TDM streams between CES modules. The reconstructed clock is also provided to the customer for use in customer edge or access/aggregation equipment on the customer premises.

Clock synchronization information is generated by clock distribution units located in the network. Each clock distribution unit is coupled to a high accuracy, high quality clock source such as derived from a Stratum 3 or better clock, e.g., Stratum 1 clock, etc. All clock sources used in the network must be traceable to a single high accuracy clock. This insures that regardless of the clock source connection selected by a CES module, all CES modules remain synchronized to each other.

With reference to the example network 10, primary clock distribution unit 22 generates clock synchronization information based on the primary clock source 20. Similarly, backup clock distribution unit 26 generates clock synchronization information based on the backup clock source 24. Alternatively, there may be additional clock sources and clock distribution units in the network for added reliability. In addition, a network may comprise a single clock source and clock distribution unit depending on the particular implementation. In the latter case, a network could not utilize the redundancy features of the present invention.

In accordance with the invention, connections are established between each of the clock distribution units and all the CES modules to be synchronized. Thus, connections (solid lines 16) are established between the primary clock distribution unit and CES modules A, B and C while connections (dashed lines 18) are established between the backup clock distribution unit and CES modules A, B and C. Preferably, the connection paths from the primary and backup clock sources are provisioned to be diverse. This helps prevent a single network failure from causing a CES module to lose both clock source connections.

Figure 2:
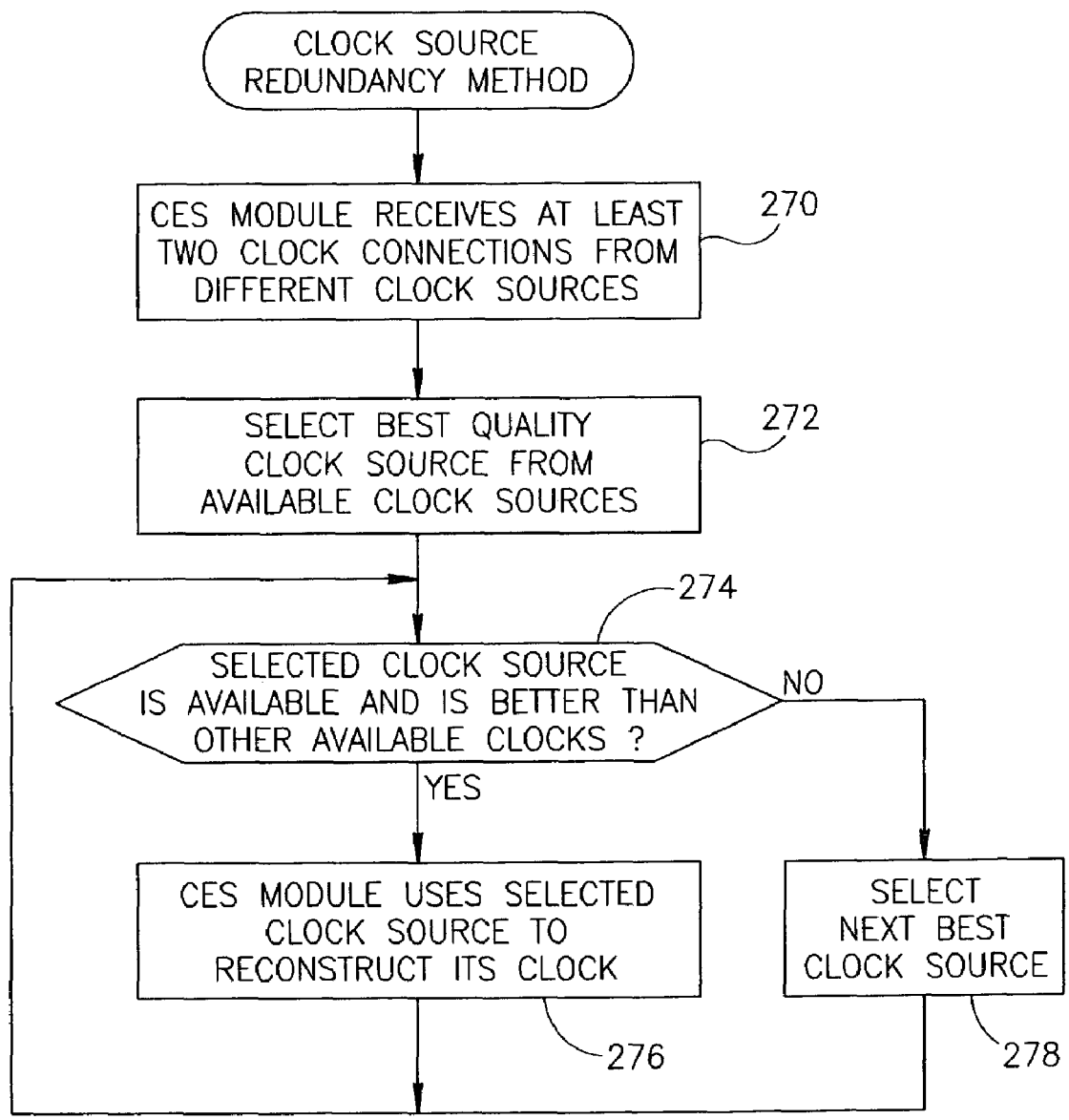
FIG. 2 is a flow diagram illustrating the clock source redundancy method of the present invention.

A flow diagram illustrating the clock source redundancy method of the present invention is shown in FIG. 2. In accordance with the present invention, clock source redundancy is provided whereby two or more clock sources are provided in the network so as to increase the reliability of the clock. Clock source redundancy is provided in order to avoid single point of failure of the clock distribution unit. Each clock distribution unit in the network sends clocking information continuously while it is the function of the CES modules to select between them based on quality and configuration.

Each CES module is adapted to receive at least two clock connections from the plurality of clock sources (step 270). In one example embodiment, each CES module is configured with a primary clock connection from one clock distributor and a secondary clock connection from another clock distributor. Typically, all CES modules are configured with the same primary clock source. It is possible, however, that some CES modules are configured to synchronize on one clock source while others synchronize on another clock source. Regardless of the particular configuration for each module, all CES modules remain synchronized to each other because all the clock sources in the network are traceable to the same single clock.

The CES module comprises means for selecting one of the received clock sources as the preferred source to be used in reconstructed the clock. The available clock sources are compared and the source with the best quality is chosen (step 272). A CES module will use the selected (or preferred) source as long as it receives valid Ethernet frames on that particular clock connection and the quality of the clock it is receiving better than the quality of the other available clock sources (step 274). This analysis utilizes a clock quality indication sent with the clock synchronization information. For example, clock quality indication may be set to low or high, or use any other suitable indication scheme. If the selected clock source is the best available, the CES module uses it to reconstruct its clock (step 276).

If the clock quality becomes unavailable (i.e. the CES module ceases to receive the clock synchronization information packets) or drops lower than that of other available clocks, the CES selects the next best clock source from the available clock sources (step 278). Note that clock quality may become low because the clock distribution unit loses its clock source or receives an indication of a bad clock reference. The CES module may stop receiving clock synchronization information packets due to one or more failures in the Ethernet network.

CLOCK DISTRIBUTION UNIT

The clock distribution unit of the present invention will now be described in more detail. As described supra, the present invention is operative to synchronize all CES modules in the network. For this to be achieved, they must all receive the same master clock reference over the Ethernet network. In accordance with the invention, the clock reference is specified in a network timestamp that is synchronized with the clock source. The network timestamp is sent periodically to provide a constant and continuous reference to all CES modules that are to be synchronized. Thus, there is a direct relationship between the count in the network timestamp and the reference clock source.

Figure 3:
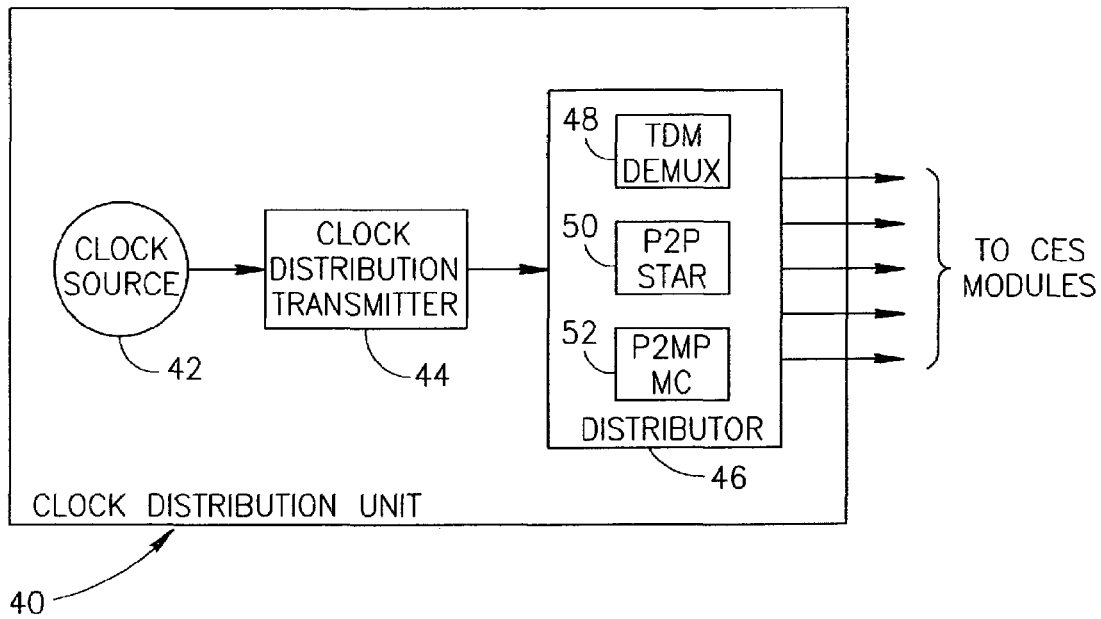
FIG. 3 is a block diagram illustrating the clock distribution unit of the present invention in more detail.

A block diagram illustrating the clock distribution unit of the present invention in more detail is shown in FIG. 3. The clock distribution unit, generally referenced 40, comprises a clock source 42, clock distribution transmitter 44 and distributor 46. The clock source is preferably an accurate, high quality reference clock such as a clock traceable to stratum-3 or better. The clock distribution transmitter receives the reference clock in any suitable manner (e.g., external, line, free running, etc.) and is operative to generate a network timestamp based on the clock reference. The network timestamps are carried in clock synchronization Ethernet packets which are sent to the CES modules. Note that depending on the implementation, the clock source may be located external to the clock distribution unit.

The network timestamp is transported in the header of clock synchronization Ethernet packets. To save bandwidth in the network, it is preferable for the clock distribution transmitter not to send any TDM payload with the clock sync packets, so that only the required clock reference information is sent through the network. There is thus no need to transmit a TDM payload in addition to the clock reference (i.e. network timestamp).

In addition, the clock distribution transmitter monitors the quality of the clock received from the clock source and marks the packets with a clock quality indication. This indication of the quality of the clock source is sent to CES modules for use in selecting the best clock source among multiple clock distributors. The clock quality indication thus enables a clock redundancy scheme to be provided in the network. For example, the values assigned to the clock quality indication may be low or high. In this case, CES modules are adapted to use a clock reference if its quality indication is high. When the quality indication drops to low, the CES module searches for a clock reference with a high quality indication to use in reconstructing the clock.

The distributor 46 functions to distribute the clock sync packets to the relevant CES modules. There are several ways to perform this function and the actual way used is not crucial to the invention. Any suitable means of delivering the clock sync packets to the CES modules may be used. As an example, several methods of distribution are present herein.

In a first scheme, a point-to-point clock connection star 50 is established from the distributor to each of the CES modules. The clock distributor is required to transmit a clock sync packet to each of the CES modules over its dedicated clock connection. In this case, the clock distributor is adapted to duplicate the clock information (i.e. network timestamp, clock quality indication, etc.) for each individual clock connection.

In a second scheme, which is a specific implementation of the first scheme, a higher order TDM demultiplexer CES module 48 is adapted to be used as a clock distributor. As an example, an OC-3 module can be used in a mode whereby the OC-3 signal is demultiplexed to 84 T1 connections so as to generate 84 copies of the clock reference information, one copy per tributary. This permits the use of a module typically used for CES grooming purposes to be used as a clock distributor.

In a third scheme, a point-to-multipoint or multicast connection 52 is established from the distributor to the CES modules. In this scheme, the clock distributor generates a single copy of the clock information and transmits it over the point-to-multipoint connection or any other network built-in multicasting mechanism in order to provide each CES module with a copy of the reference clock sync packets.

In addition, a combination of the above schemes may also be used, wherein a portion of the duplication of the reference clock information is performed by the distributor and a portion is performed by a multicasting function within the network itself.

Figure 4:
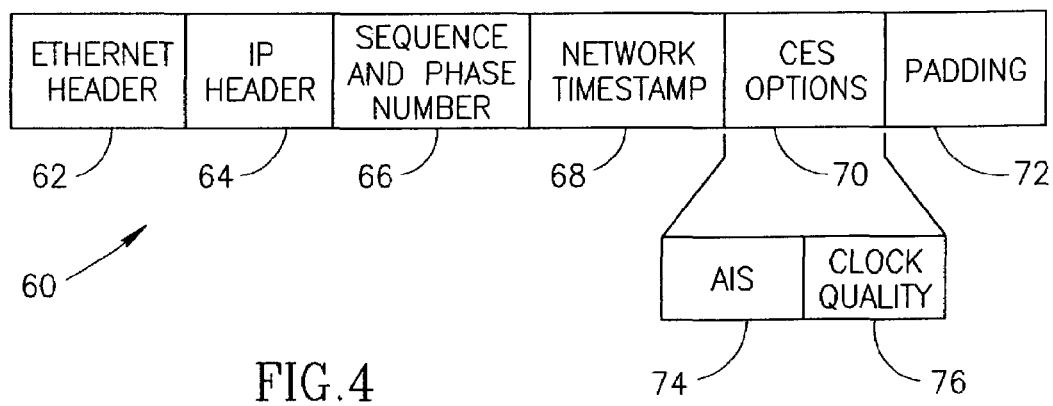
FIG. 4 is a diagram illustrating the structure of an Ethernet packet adapted to transport a sequence number, phase number and transmitter generated network timestamp.

A diagram illustrating the structure of an Ethernet packet adapted to transport a sequence number, phase number and transmitter generated network timestamp is shown in FIG. 4. In accordance with the present invention, the TDM clock reference information is sent through the Ethernet network as clock synchronization packets. The clock sync packets are Ethernet packets with headers modified to transport the sequence number, phase number and the network timestamp.

In particular, the clock synchronization Ethernet packet, generally referenced 60, comprises a plurality of fields comprising: an 18-byte Ethernet header 62, a 24-byte IP header 64, two bytes for sequence and phase numbers 66, a 4-byte network timestamp 68, a CES options field 70 and padding 72. The padding is required in the event the contents are less then the minimum size Ethernet packet. A sequential sequence number of suitable width, e.g., 16-bits, is also generated and inserted into the clock sync Ethernet packet. The sequence number is used by the CES receiver in the event clock sync packets arrive misordered. The CES options include flags, indicators, command fields, etc. In particular, an Alarm Indication Signal (AIS) field 74 and clock quality indication 76 are included. In one embodiment, the AIS field is used to indicate the loss of the clock reference. The clock quality indication is used to convey a measure of the quality of the clock reference being received by the clock distribution transmitter 44 (FIG. 3). Depending on the implementation, the AIS field may not be required since it is essentially conveyed using the clock quality indication.

Note that the frame format shown herein is intended as an example. It is appreciated that other frame formats can be used with the clock distribution mechanism of the present invention. In addition, in alternative embodiments, the timestamp is omitted and the sequence number is used in its place.

Further, the AIS bit may be omitted, if the clock quality field is included. Optionally, the AIS bit may be used to indicate "no OC-3 line" in the event that an OC-3 module is used to distribute the clock. In this case, an external reference clock is connected to the OC-3 module which enables it to send the timestamps.

CLOCK DISTRIBUTION TRANSMITTER

Figure 5:
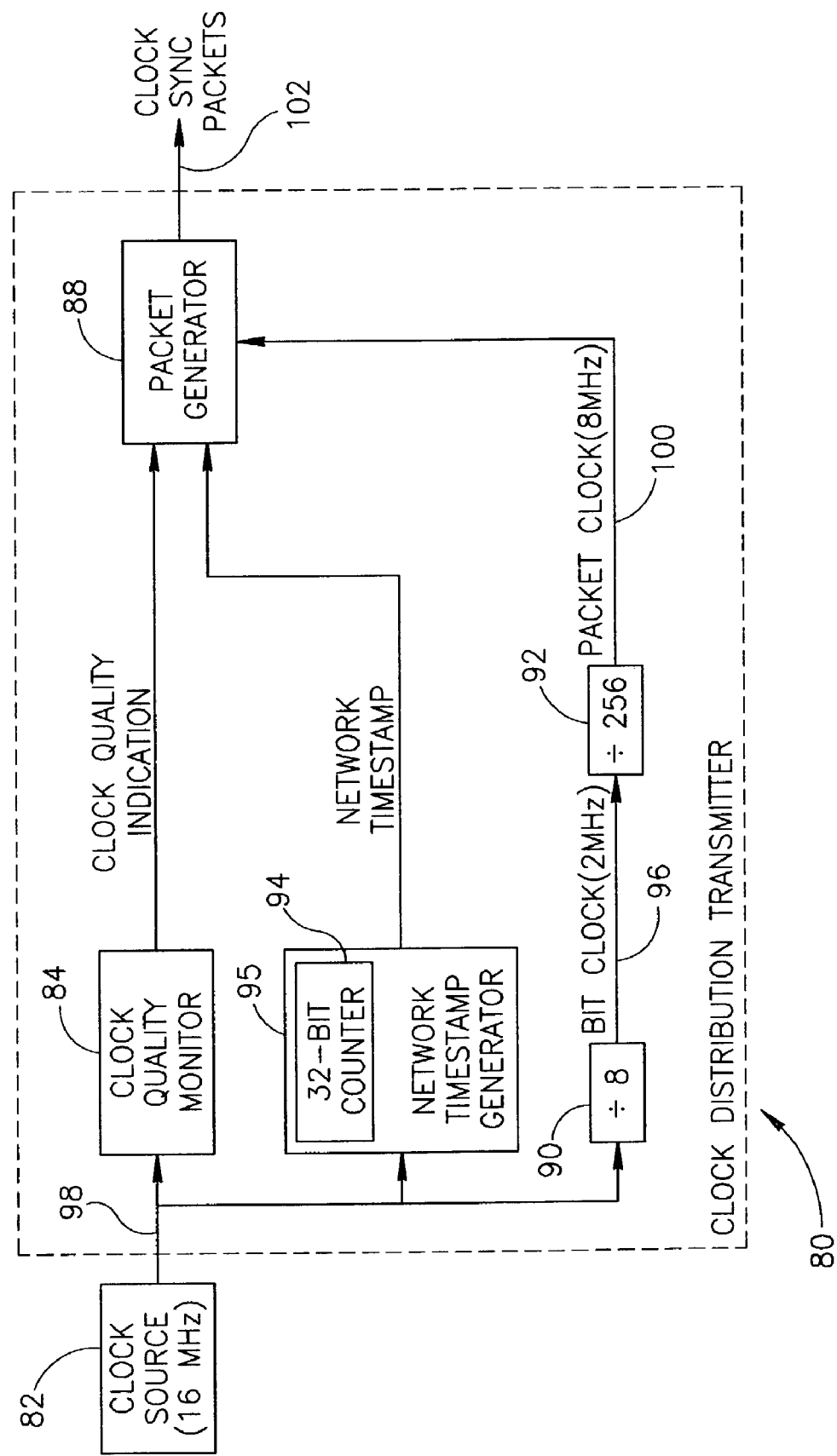
FIG. 5 is a block diagram illustrating the clock distribution transmitter of the present invention in more detail.

The clock distribution transmitter will now be described in more detail. A block diagram illustrating the clock distribution transmitter of the present invention in more detail is shown in FIG. 5. The transmitter, generally referenced 80, comprises a clock quality monitor 84, network timestamp generator 95 and packet generator 88. The clock reference 82 is connected to the transmitter and used to generate the reference clock information and derive the various clocks required by the transmitter module. In this example embodiment, the reference clock has a frequency of 16 MHz which is also the frequency of the clock reconstructed by the CES modules.

Note that for illustration purposes, the invention is described in the context of a clock distribution unit adapted to transmit clock sync packets at the E1 rate of 2 MHz. One skilled in the art, however, can adapt the CES module to handle other rates as well such as T1, T3, E3, etc. without departing from the scope of the invention.

In operation, the network timestamp generator 95 is operative to generate the network timestamp from the reference clock. The network timestamp is generated by a free running wrap around counter 94 adapted to be clocked by the clock reference. The counter is preferably at least 32 bits wide. The resolution and degree of jitter and wonder of the reconstructed clock by the CES modules is influenced by the width of the network timestamp and more so by the width of the counter at the receiving end.

The clock quality monitor 84 functions to monitor the quality of the clock reference and generate a quality indication therefrom. When the monitor senses degradation in the quality of the clock reference it is receiving, it marks the clock quality indication field of the clock sync packet accordingly. Degradation may be sensed, for example, by losing the clock source altogether in a loss of signal (LOS) condition or by receiving an alarm indication signal (AIS) on the clock source.

Both the clock quality indication and the network timestamp are input to the packet generator 88 which functions to assemble the clock synchronization packets. The packets are assembled with all required fields, e.g., source and destination addresses, sequence number, phase number, Ethertype, length, etc. The completed clock sync packets are output to the distributor 46 (FIG. 3).

The packet generator is clocked by the 16 MHz clock after a divide by eight 90 to generate a 2 MHz E1 rate clock 96. The 2 MHz clock is further divided by 256 via divider 92 to generate an 8 kHz packet clock 100. The packet generator uses the packet clock to generate a clock sync Ethernet packet at every E1 frame time.

CES RECEIVER MODULE

Figure 6:
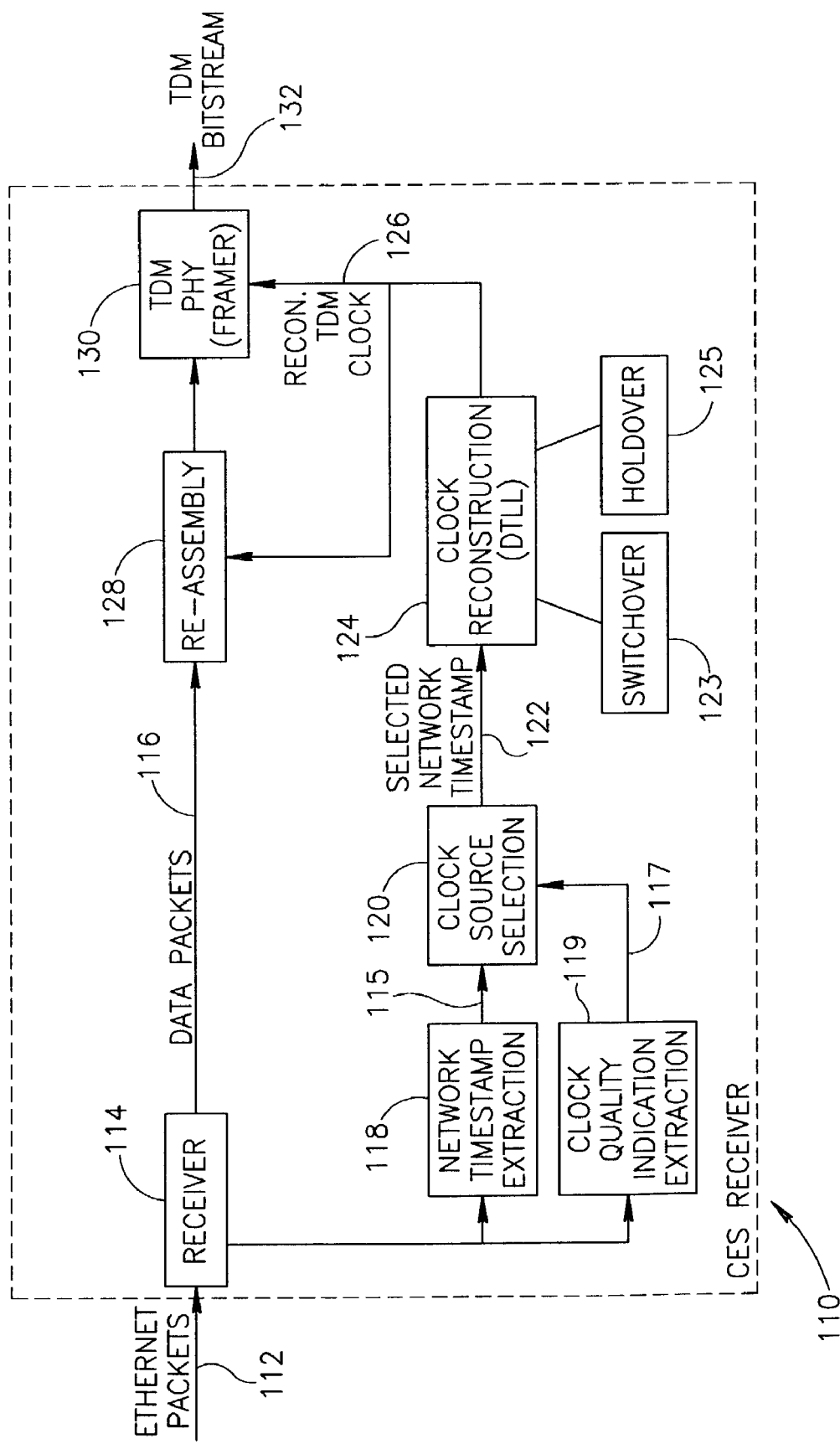
FIG. 6 is a block diagram illustrating the CES receiver of the present invention in more detail.

A block diagram illustrating the CES receiver of the present invention in more detail is shown in FIG. 6. The CES receiver module, generally referenced 110, comprises a receiver 114, reassembly unit 128 and TDM PHY 130 commonly referred to as a framer or Line Interface Unit (LIU). It also comprises means for reconstructing the TDM clock from the received clock sync Ethernet packets.

The CES receiver functions to receive clock synchronization information on its clock connections and use it to reconstruct a local clock synchronized to the distributor clock. Since all CES modules in the network perform the same clock reconstructions, all receiving the same clock synchronization information, they are all therefore synchronized to each other.

Ethernet packets are received by the receiver 114 which functions to separate clock sync packets from other traffic. Packets 116 other than clock sync packets, e.g., TDM data packets, are reassembled into TDM frames by the reassembly unit 128. The frames are then input to the TDM framer 130 for transmission onto the TDM communication line as a TDM bitstream 132.

Clock sync packets are output by the receiver to the network timestamp extraction unit 118 which functions to extract the network timestamp. The clock quality indication extraction unit 119 functions to extract the clock quality indication from the received clock sync packets. The network timestamp 115 and the clock quality indication 117 are input to a clock source selection unit 120 which functions to choose one of the received clock sources as a preferred clock reference. The clock source selection unit performs the method of FIG. 2 using the clock quality indication as a metric to select a clock reference. The timestamp 122 of the selected clock source is input to the clock reconstruction module 124.

The clock reconstruction module implements a Digital Time Locked Loop (DTLL) operative to reconstruct and output the TDM clock 126. The clock output is used by the reassembly unit and the framer to generate the synchronous TDM output data stream. Note that alternatively, the output of the clock reconstruction module may comprise a clock control signal adapted to correspond to the desired clock frequency.

Note that for clarity only the receive direction of operation is shown in FIG. 6. It is appreciated that the CES module operates in the transmit direction as well wherein TDM data is received by the TDM PHY, segmented and encapsulated into Ethernet packets. Depending on the implementation, more than one TDM frame may be encapsulated into a single Ethernet packet. Alternatively, a TDM frame may span more than one Ethernet packet. Note that alternatively, the CES receiver may be adapted to receive and process clock sync packets only. Thus, depending on the implementation, the CES module may also comprise means for transmitting and receiving TDM data streams.

Figure 7:
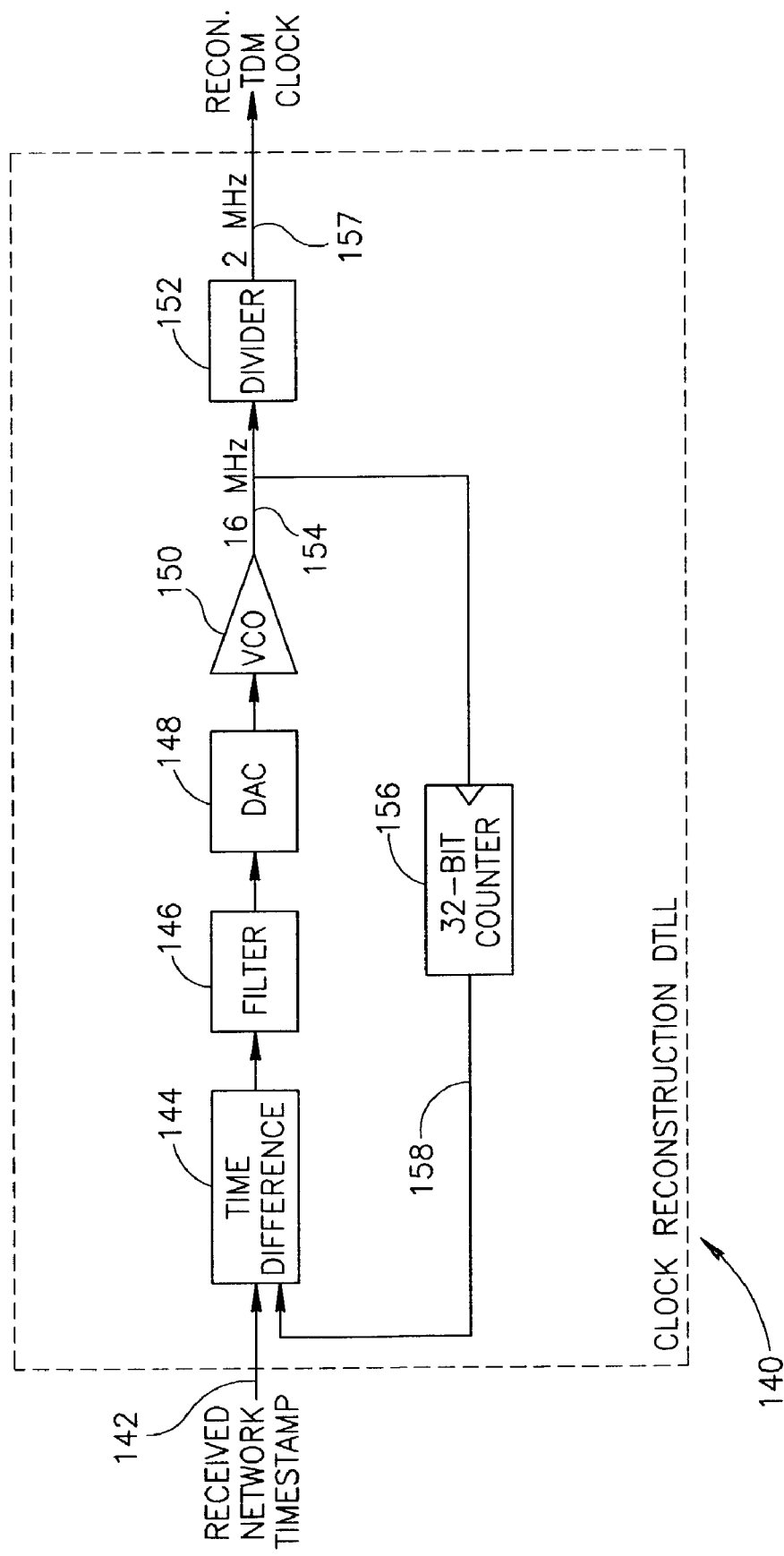
FIG. 7 is a block diagram illustrating an example clock reconstruction Digital Time Locked Loop (DTLL) module constructed in accordance with the present invention.

The clock reconstruction DTLL module will now be described in more detail. A block diagram illustrating an example clock reconstruction DTLL module constructed in accordance with the present invention is shown in FIG. 7. The clock reconstruction DTLL module, generally referenced 140, comprises a time difference unit 144, filter block 146, digital to analog converter (DAC) 148, voltage controlled oscillator (VCO) 150, divider 152 and counter 156. The clock reconstruction module is operative to function as a DTLL wherein the differences between the network timestamp 142 and a locally generated timestamp 158 are tracked and locked such that the original TDM clock is recovered, e.g., 2 MHz E1 clock. The accuracy of the reconstructed clock in terms of frequency, jitter, jitter tolerance, wonder and other parameters is sufficient to meet carrier standards such as G.703, G.823 for E1 rates and I.431, G.703, TR-TSY 499, TR-TSY 253 for T1 rates.

The DTLL loop comprises the difference circuit, filter, DAC, VCO and counter. In operation, the local timestamp is generated by a free running 32-bit counter 156. The clock for the counter comprises the output 154 of the VCO 150, e.g., 16 MHz signal. The nominal frequency of the VCO is 16 MHz which is 8 times the TDM data rate of 2 MHz. In general, the counters in the transmitter and receiver are clocked at a rate that is a multiple of the TDM rate. This is, to increase the accuracy of the reconstructed clock at the receiver. In addition, 32-bit counters are used to provide sufficient resolution for the DTLL filter to discern differences between the master and slave clocks.

The filter is operative to generate a clock control signal based on the values of the received network timestamp 142 and the locally generated timestamp 158. The local timestamp is generated upon receipt of a clock synchronization packet. The digital clock control signal is converted into an analog signal by the DAC 148 and applied to the VCO 150. The output of the VCO constitutes the clock for the free running 32-bit counter used to generate the local timestamp. The 16 MHz output of the VCO is also input to a divide by eight block 152 which functions to output the reconstructed TDM clock 157 (e.g., 2 MHz E1 clock) which is used by the framer to generate output TDM data streams.

In an example embodiment, the time or phase detector 144 and the filter block are implemented using a DSP, MCU, microprocessor or other processing device. The DAC comprises a 12-bit DAC. The VCO may comprise a VCXO configured to generate a 16 MHz nominal frequency signal. The VCXO may be configured to generate other frequencies in accordance with the frequency of the particular TDM stream to be transported across the Ethernet network. The remaining functions are provided by the encapsulation machine circuitry incorporated in an FPGA and adapted to implement frequency division, network timestamp extraction, local timestamp generation and delivery of the TLL control parameters and performance monitoring (PM) registers from/towards the CPU or other central controller accordingly.

The DTLL is operative to generate the TDM clock according to the differences between the network timestamps and the local timestamps as read from the counter at the time a clock synchronization packet arrives. The DTLL implements a closed loop tracking system wherein the equilibrium point is a constant value of network timestamp minus local timestamp. Deviations in the equilibrium point are corrected by the DTLL.

In accordance with the invention, each CES module receives the same clock reference information, thus all CES modules reconstruct the same clock. This causes the CES modules to be synchronized to the master clock source and to each other. Thus TDM connections between CES modules and between CES modules and customer equipment all use clocks derived from the same master clock.

Figure 8:
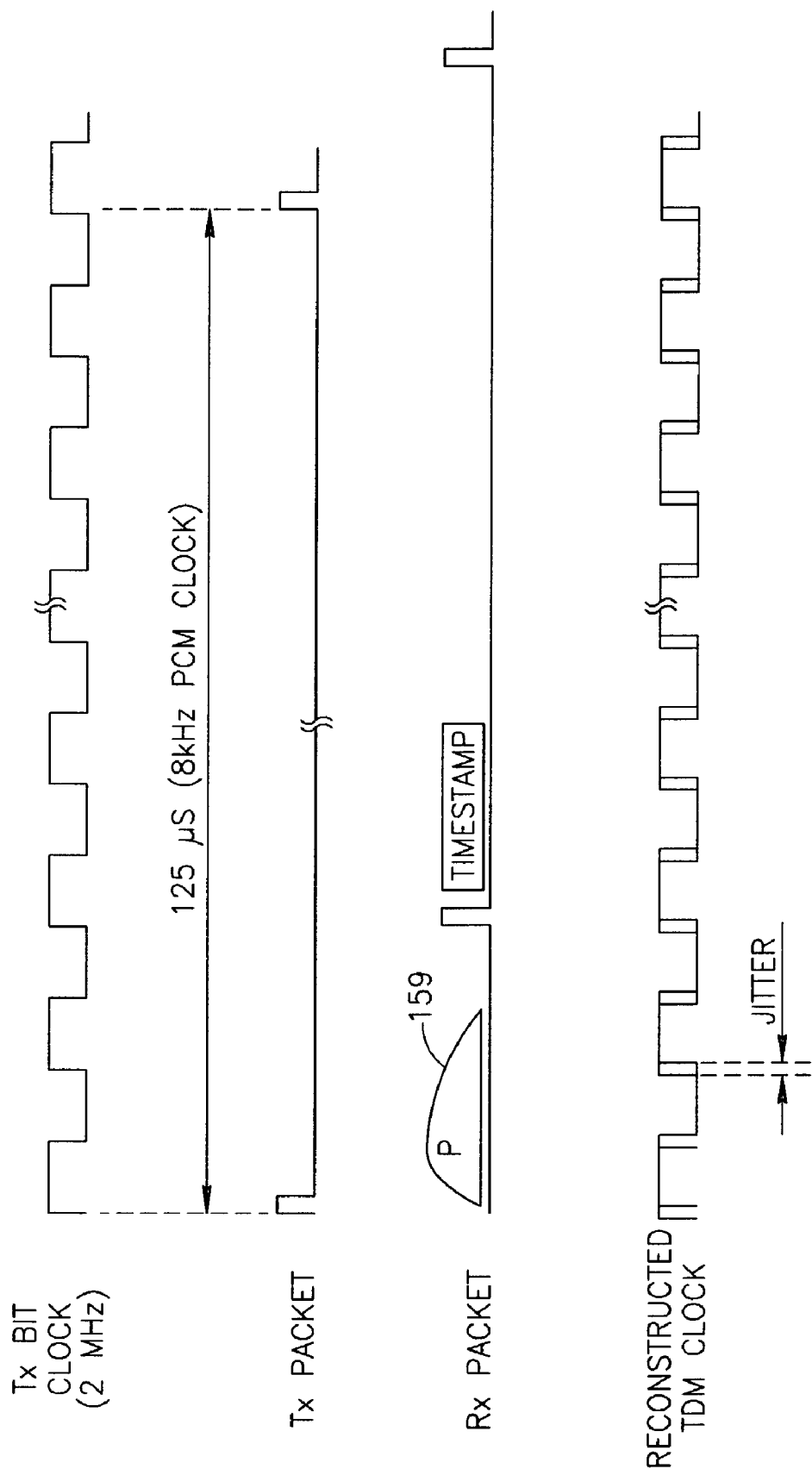
FIG. 8 is a diagram illustrating the timing of the transmit and receive packets incorporating the network timestamp in accordance with the present invention.

A diagram illustrating the timing of the transmit and receive packets incorporating the network timestamp in accordance with the present invention is shown in FIG. 8. The timing of the Tx packet, Rx packet and reconstructed local clock is shown in relation to the original 2 MHz E1 transmit bit clock. The clock distribution transmitter is operative to generate a Tx Ethernet packet every E1 frame which is 125 microseconds long corresponding to the 8 kHz PCM clock. Thus, a network timestamp is transmitted every packet time. Probability of arrival of the packet at the receiver is variable and is constantly changing due to changing conditions in the network. Eventually, the packet arrives but the arrival times cannot be predicted. Packets may get lost, they may arrive out of order and may arrive with difference delays. For this reason, the invention does not use the 8 kHz TDM rate embodied in the absolute packet arrival times to reconstruct the TDM clock. Rather, the present invention utilizes the relative difference between the network timestamp and the local timestamp in reconstructing the local clock. In addition, the local clock is recovered based on data derived from a large number of sets of timestamps. The reconstruction mechanism is operative to lock onto the frequency of the master clock source and in addition to maintain the amount of clock jitter at a low enough level to meet carrier transmission standards.

Note that the probability of arrival curve P (referenced 159) represents a Poisson delay distribution of the arriving packets. The probability of arrival is zero to the left of the curve and is infinite to the right of the curve. The delay times of arrival vary since Ethernet networks cannot guarantee constant network delays.

Figure 9:
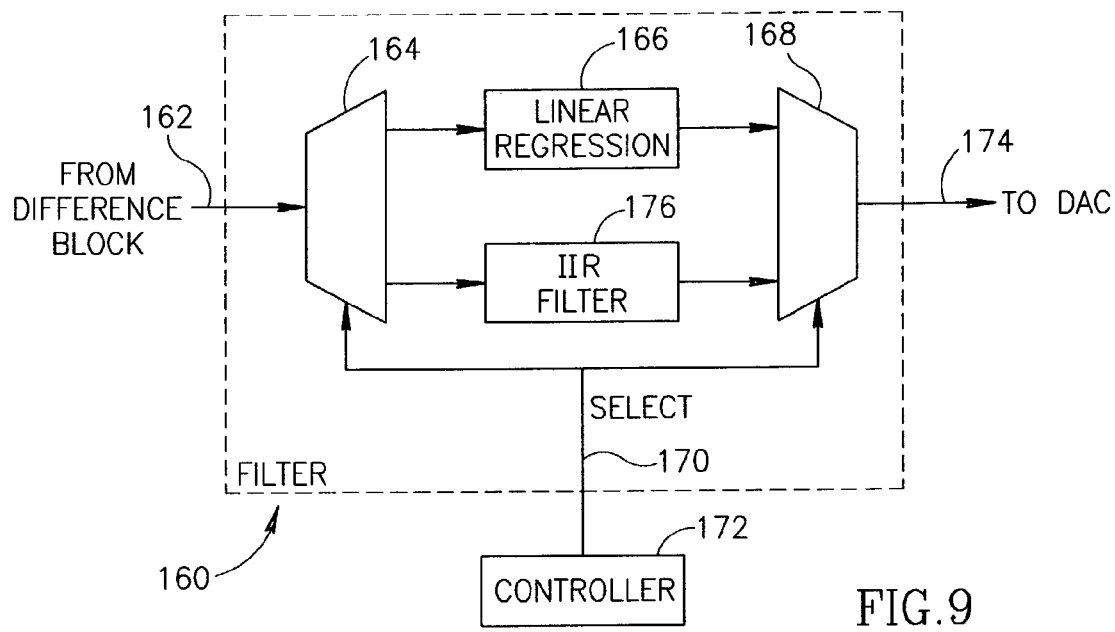
FIG. 9 is a block diagram illustrating an example filter circuit of the CES module constructed in accordance with the present invention.

A block diagram illustrating an example filter circuit of the CES module constructed in accordance with the present invention is shown in FIG. 9. The filter is a key part of the clock synchronization mechanism and is adapted to perform two mathematical functions on the timestamp data. The first is Least Square Regression (LSR) and the second is Infinite Impulse Response (IIR) filtering. Both are described in more detail infra. The filter circuit implements a heuristic whereby the input and output signals of the filter are analyzed and the appropriate action is taken based on the analysis.

The filter block, generally referenced 160, comprises a demultiplexer 164, linear regression module 166, IIR filter module 176 and output multiplexer 168. The input data 162 from the difference block is steered either to the linear regression block or the IIR filter block by the demultiplexer. A controller 172 provides the select control signal 170 for the input demultiplexer and the output multiplexer. Both the linear regression block and the IIR filter are operative to generate a digital clock control signal 174 output that is converted by the DAC to an analog control signal for the VCO.

The Least Squares Regression block is used in the initial stage of the clock reconstruction mechanism. In this initial stage, the receiver generates a set of measurements that correspond to the difference between the network and local timestamps. The receiver performs a Least Square Linear Regression algorithm on these samples and calculates the initial voltage for the VCXO. The samples are plotted on a graph wherein the X-axis represents the locally generated timestamp and the Y-axis represents the received network timestamp. The best straight line drawn through the sample points that meets the Least Square Linear Regression requirements represents the locked value of clock frequency.

Figure 10:
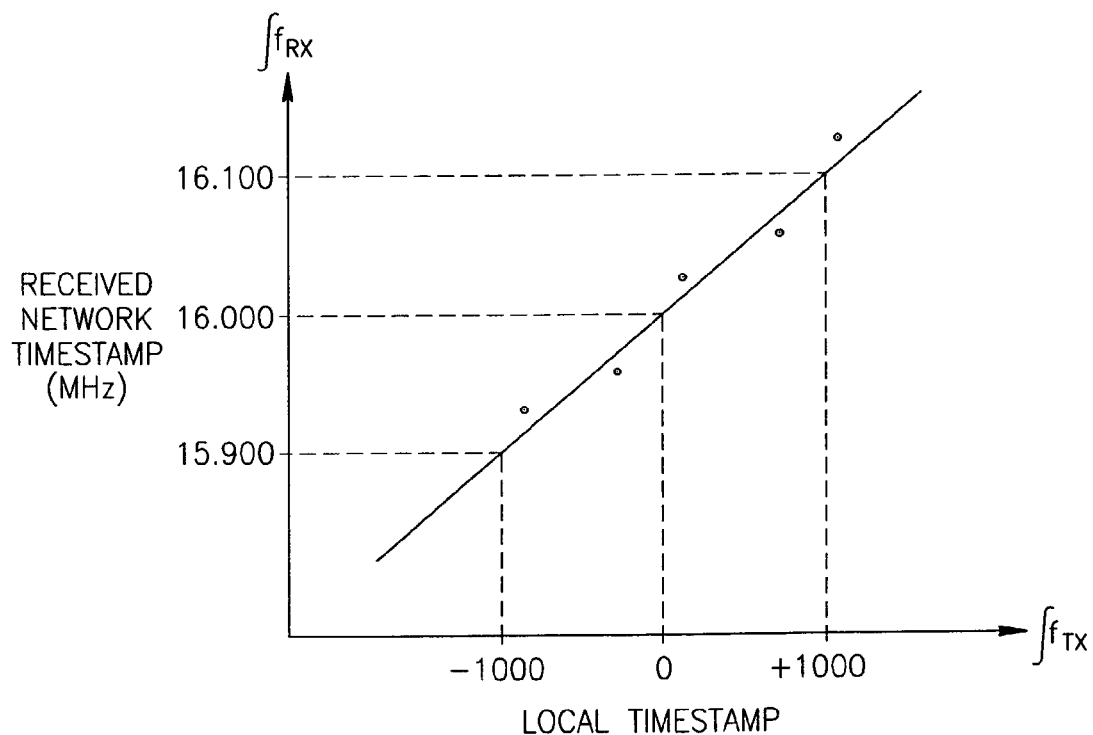
FIG. 10 is a graph of the local timestamp versus the receive network timestamp whereby a Least Squares Regression (LSR) filter is applied to determine the correction to apply to the clock control signal in accordance with the present invention.

An illustrative example is presented below. A graph of the local timestamp versus the receive network timestamp whereby a Least Squares Regression (LSR) filter is applied to determine the correction to apply to the clock control signal in accordance with the present invention is shown in FIG. 10. Depending on the implementation, the timestamps may be normalized before Linear Regression techniques are applied. Linear Regression is used to fit the best straight line through the sample points. The slope of the line indicates how close the local timestamp is tracking the network timestamp which is directly related to how well the local slave clock is tracking the master clock. If the slope of the line is equal to 45 degrees then the two clocks are running at the same frequency. If the slope is greater than 45 degrees, this indicates that the master clock is faster than the local clock and the frequency of the local clock should be increased. Similarly, if the slope is less than 45 degrees, this indicates that the local clock is faster than the master clock and the frequency of the local clock should be reduced.

The LSR algorithm operates on blocks of 64 sample points (i.e. pairs of timestamps). Blocks comprising a higher or lower number of sample points may also be used. Selecting the number of sample points represents a tradeoff between buffer size, delay time and accuracy.

Based on the slope calculated, the clock control signal input to the DAC is adjusted and the VCO output frequency is modified accordingly. The algorithm waits a predetermined period of time for the loop to stabilize with the new frequency before acquiring and processing the next block of 64 samples. Note also that it is desirable to have slow convergence of frequency since slow convergence reduces the output jitter. Fast clock recovery operation typically results in larger amounts of jitter.

In one embodiment, the LSR algorithm is used to provide coarse tuning to quickly acquire the local clock frequency with a sufficient accuracy for the next stage of the clock reconstruction which is the IIR filter. The IIR filter performs the slow fine-tuning of the recovered clock, operates over a large number of sample points and is more accurate than the LSR algorithm. Typically, the LSR algorithm is capable of converging to a frequency within a few seconds. In the example embodiment presented herein, only five iterations of the LSR algorithm are required to acquire the initial frequency. The IIR filter requires on the order of several minutes to converge and to generate a stable frequency.

Figure 11:
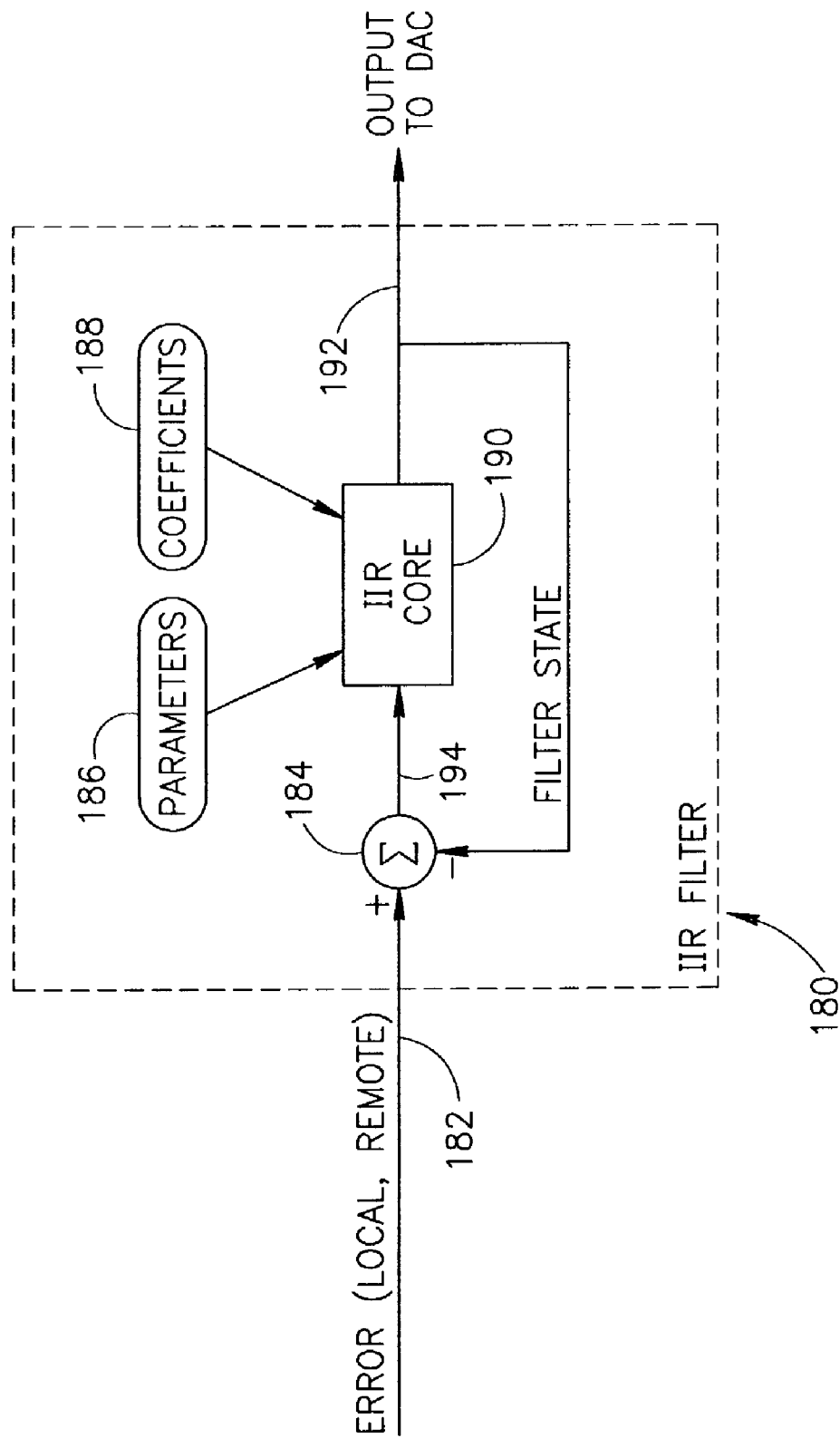
FIG. 11 is a block diagram illustrating an example implementation of the IIR filter constructed in accordance with the present invention.

Infinite Impulse Response filtering is performed after frequency locking is achieved using the Least Squares Regression algorithm. Infinite Impulse Response filtering is performed on the calculated differences between the received network timestamps and the local generated timestamps so as to determine the appropriate input voltage of the VCXO to maintain frequency lock as shown in FIG. 11. The IIR filter, generally referenced 180 comprises a subtractor 184 and IIR filter core 190. The current filter state 192 is subtracted from the input error signal 182 derived from the network and local timestamps to generate a difference signal 194 which is input to the IIR core. Also input to the IIR core are one or more filter parameters 186 and the filter coefficients 188. The output 192 of the IIR core is the clock control signal output to the DAC to generate the analog input signal to the VCXO.

Typically after performing LSR filtering, the jitter is too large to meet the required standards. Therefore, IIR filtering is performed once the LSR algorithm completes. When IIR filtering is begun, it is assumed that the master and local clock frequencies are substantially equal which is the reason why the IIR algorithm can be configured to converge slowly. The IIR filter algorithm utilizes several variables including the algorithm state and impulse response state variables. The state variables are modified during each iteration of the filer as occurs in classical IIR filtering. As described supra, the input to the IIR filter algorithm is the difference between the network and local timestamps which are both 32-bit numbers. The timestamps are assumed to be normalized or equivalent and the difference should normally be relatively small. The calculated difference in timestamps is used to calculate new state variables as expressed below in Equation 1.

$$[\text{state}] = (1-\alpha)[\text{state}] + \alpha \cdot [\text{timestamp difference}] \quad (1)$$

Note that the quantities in brackets represent vector quantities. The update factor $\alpha$ determines the rate of convergence and the sensitivity of the IIR filter to changes. A suitable value for the update factor $\alpha$ is $2^{-20}$ which was found by trial and error. The update factor represents a tradeoff between stability and convergence. A relatively small value for the update factor influences the filter state very little while a larger value allows the filter to better track changes in the master clock frequency. Preferably, it is desirable to set the value of the update factor as small as possible while still being able to track changes. The value given above represents a satisfactory tradeoff between these two competing goals. A small update factor yields a very stable output whereby any one iteration does not influence the filter state very much. The small update factor also yields the smallest clock jitter and wonder. Thus, the stability of the filter is due to the small value given to the update factor. While the filter achieves high stability, the convergence time of the filter is on the order of several minutes.

It is important to note that the clock reconstruction mechanism is not sensitive to lost packets. In the event of lost packets, the previous data is reused so as to implement a holdover or flywheel technique. If several packets are lost, the IIR filter continues to output a stable output due to the small update factor. Worst case, the filter reacquires sync by switching to the LSR algorithm. The output clock, however, will not slide out of its frequency window.

Another advantage is that the state variables in the IIR filter are constantly being updated and thus comprise a huge amount of historical data. The output of the IIR filter is not determined based on any single timestamp but on a large amount of historical data. Thus, the influence of several lost clock synchronization packets on the output clock is minimized. TDM clock resync systems, on the other hand, lose the clock in the event the clock edge is lost. After the loss of only several clock edges, the clock phase and frequency are lost.

In accordance with the invention, the DTLL is constructed such that the resolution of the state variables is much larger than the resolution of the DAC. Thus, once the IIR filter converges, the clock control signal input to the DAC typically oscillates between +1 and −1 values (assuming a delta type DAC). As has been found in practice, many times, the clock control signal is constant, i.e. no adjustment is required.

A large number of error packets will, however, affect the clock jitter. Misordered packets do not affect the clock since they are corrected using the sequence numbers transmitted with each packet. In addition, an optional mechanism may be used as a check on the clock frequency whereby the pointer position of the buffer of timestamp values is examined. This technique is well known in the art, whereby the pointer is normally set to lie in the middle of the buffer. Differences in the two clocks will cause the pointer to move out of the middle position.

The controller functions to switch the filtering mechanism between the LSR and IIR filter algorithms in accordance with certain criteria utilizing a mechanism shown in FIG. 9. At startup, the filter is configured to perform the Least Squares Regression algorithm for either a fixed number of iterations or until the frequency converges to with a predetermined error function threshold. At that point, the filter switches and begins to perform IIR filtering. In addition, certain event will cause the filter to restart and switch back to the LSR filtering algorithm. Such events include, but are not limited to, loss of signal, startup, change of configuration parameters of the connection, out of synchronization indication, after a reset operation, after a hop swap operation and after an extended interruption of traffic.

It is noted that running a timestamp inside the packet provides a large amount of information to use for clock reconstruction and synchronization. Since the timestamp counts are accumulative (increase every frame) there are more information bits with every incoming frame. Thus, in effect, all the timestamp measurements are integrated from the time the IIR filter algorithm was last started. By keeping the gap between the timestamps constant (i.e. between network and local timestamps) it is virtually guaranteed that the slave clock frequency substantially matches the frequency of the master clock.

In addition, since the timestamps are generated by a clock that is a multiple of the TDM data rate (e.g., 8 times faster or 16 MHz) than the recovered clock, it can be assured that the phase shift of the recovered clock (jitter or wander) is bounded to 1/[rate factor] of the clock cycle as long as frequency lock is maintained (1/[rate factor]=1/8 in the example presented herein). The quantity rate factor represents how many times faster the recovered clock is compared to the TDM data rate. Using a high frequency clock for the timestamp on both ends provides sufficient information to compensate for significant values of network delay variation parameters.

As an alternative, the filter can be adapted to (1) perform only the LSR algorithm, (2) only the IIR filter algorithm or (3) a combination of the two. In the case where only the LSR algorithm is used for filtering, an additional number of iterations need to be performed to provide the required sensitivity and acceptable levels of jitter and wonder. The LSR algorithm, however, is not set to converge as rapidly since it is desired to increase the accuracy and stability of the reconstructed clock. In addition, the LSR process is adapted to be performed with additional data points.

In the case where only IIR filtering is used, the state variable update factor in the IIR filter is increased in order that the output converge faster while sacrificing a small amount of stability. In the case where both filtering techniques are used the controller is adapted to control the execution of the LSR and IIR filter algorithms based on suitable criteria as described supra.

In accordance with the present invention, the CES receiver comprises a switchover mechanism 123 (FIG. 6) for providing smooth transitions when the CES receiver switches from one clock source to another, such as part of its redundancy method described hereinabove in connection with FIG. 2. A switchover mechanism is desirable considering that each clock distributor comprises its own individual local counter that started at a time different from that of other distribution units. Without a switchover mechanism, switching arbitrarily between clock sources causes the DTLL to resynchronize to the new source reducing the quality of the reconstructed clock.

The switchover mechanism relies on the fact that the CES module knows when it switches to another clock source. Knowing the exact time of the switchover, the CES module adapts the local timestamp to the newly received timestamp such that the DTLL continues to be synchronized with the new network timestamps received from the new distributor. The result being no degradation of clock synchronization during switchover from one clock source to another. Note that the counter adaptation is a one-time action performed once per clock source switchover.

In addition, the CES module of the present invention comprises a holdover mechanism 125 (FIG. 6). The holdover mechanism is useful in the event that all sources of the clock are lost. This may occur as a result of a catastrophe in the network, for example. In the event all clock sources are lost, the holdover mechanism causes the DTLL to continue to input to the VCO 150 (FIG. 7) the last value it generated. This produces a "flywheel" effect where the CES receiver continues to reconstruct the clock using the last synchronized frequency, rather than take other action such switching to its internal oscillator.

Edge Switch Embodiment

A network device can be adapted to incorporate the clock distribution unit and/or CES receiver of the present invention. Hardware means and/or software means adapted to execute the mechanism may be incorporated within a network device such as a core switch, edge switch, Network Management System, Label Switching Router (LSR), network switch or any other wired or wireless network device. The device may be constructed using any combination of hardware and/or software.

Figure 12:
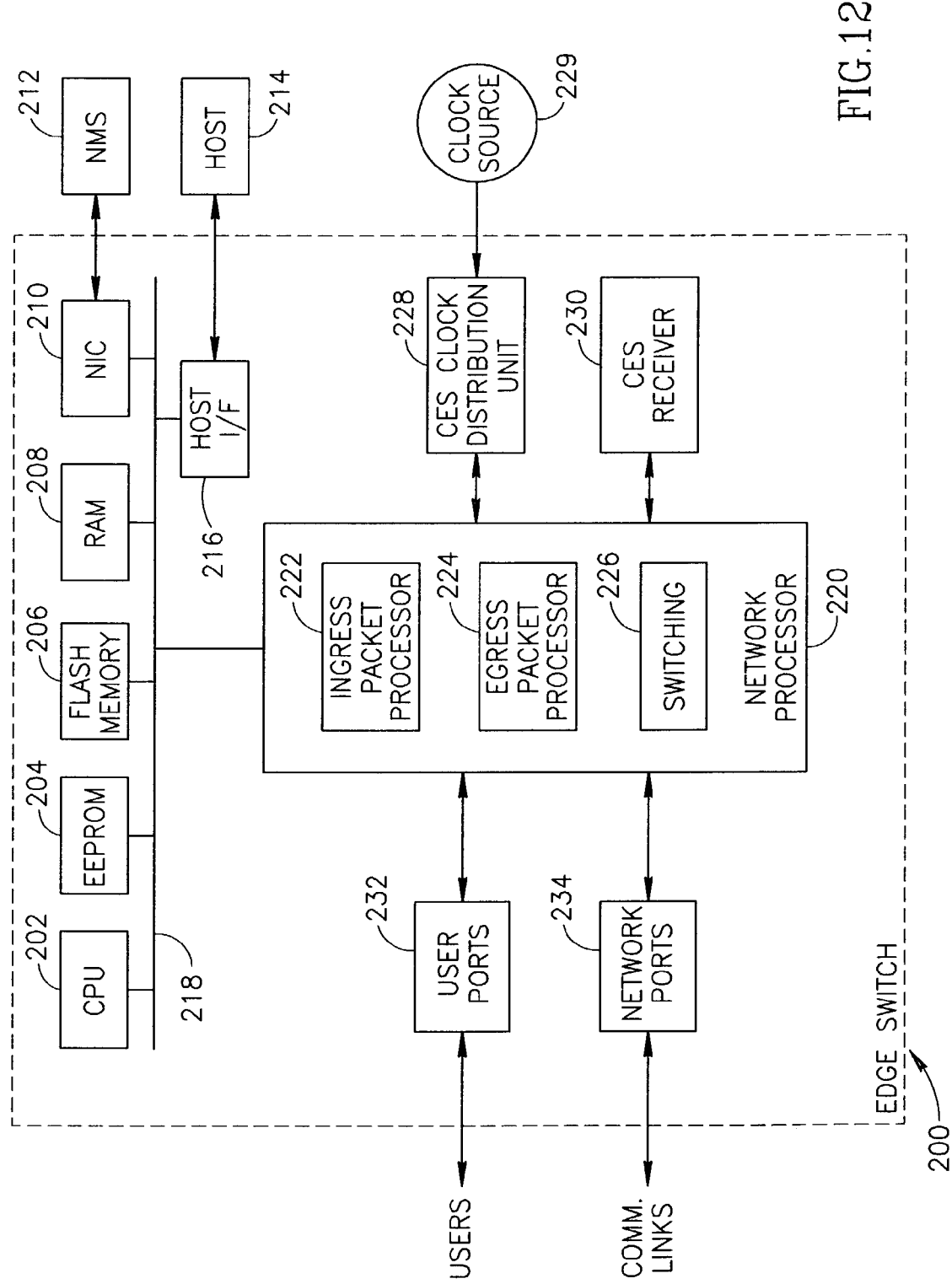
FIG. 12 is a block diagram of an edge switch incorporating the clock distribution unit and/or CES receiver of the present invention.

A block diagram of an edge switch incorporating the clock distribution unit and/or CES receiver of the present invention is shown in FIG. 12. The edge switch, generally referenced 200, comprises at its core a network processor 220, link or network interface ports 234, edge or user ports 232, a network interface 210 for interfacing the edge switch to a NMS 212, a central processor 202, e.g., CPU, and both volatile and non-volatile memory including RAM memory 208 for storing data and application program code, Flash memory 206 for storing boot and application code and EEPROM 204 for storing configuration data. The CPU communicates to the network processor, memory peripherals and other support devices via a bus 218.

The edge switch 200 comprises an edge or user side and a network side. The one or more line interface cards containing network ports 234 provide the PHY interface to two-way communication links. As an example, the line interface cards may be adapted to interface to any combination of the following communication links: any variety of copper or optical based Ethernet, Token Ring, FDDI, SONET/SDH, ATM, RPR.

A plurality of edge ports 232 are provided for connecting directly or indirectly through access/aggregation devices to a plurality of users or edge devices. The edge side interfaces to the user or edge device via any suitable type of interface, e.g., Gigabit Ethernet (GE), Fast Ethernet (FE), PDH interface (e.g., T1/E1), etc. Likewise, the network side interfaces to other edge switches or the core network via any suitable interface such as Optical Ethernet (e.g., 1GE, 10OGE, etc.), TDM, RPR, etc. A plurality of edge switches may be connected to each other to form a stack whereby the edge switches at the ends of the stack are connected to core switches. In this case, connections may be built using both VLAN and MPLS based technology. Alternatively, the network may comprise only edge switches whereby a plurality of edge switches are connected in a ring topology. The network processor 220 implements the switching fabric (switching block 226) for providing the switching functionality of the device. Depending on the specific implementation, the switching fabric may comprise, for example, hardware for performing VLAN tagging, MPLS, Frame Relay, ATM switching, CSIX or any other fabric to network interface protocol. The network processor includes one or more packet processing engines (PPE) that comprises an ingress packet processor 222 and an egress packet processor 224. The network processor also comprises timestamp circuits, clock circuits, memory, counters and CPU interface (not shown), means for performing Hello (or availability) protocol processing (part of this capability may reside in the CPU as well). The network processor may be implemented as a microcontroller, microprocessor, microcomputer, ASIC core, FPGA core, central processing unit (CPU) or digital signal processor (DSP) or any other suitable computing means.

The clock distribution unit 228 functions to generate and distribute clock synchronization Ethernet packets to CES modules to be synchronized in the network. The operation of the clock distribution unit is as described hereinabove in connection with FIG. 3. A network timestamp is generated based on the clock reference source 229 connected to the distribution unit.

The CES receiver 230 functions to receive the clock synchronization information on its clock connection and use it to reconstruct a local clock synchronized to the distributor clock. Since all CES modules perform the same clock reconstructions since they all receive the same clock synchronization information, they are all therefore synchronized to each other. The operation of the CES receiver is as described hereinabove in connection with FIGS. 6 through 11.

Note that it is not intended that the clock distribution unit and CES receiver module be limited to any particular type of SONTE/SDH/PDH or TDM streams, e.g., T1, E1, etc. In addition, the invention is not limited in the number of clock sources, clock connections or TDM streams in the network.

The edge switch also comprises a NIC 210 for providing an out of band interface for connecting to external entities such as a craft for local maintenance and configuration purposes, a NMS for centralized provisioning, administration and control or a Local Area Network (LAN). The network device may comprise additional interfaces, such as a serial interface for connecting to a PC for configuration purposes.

The central processor 202 implements the major functionality of the edge switch including higher software layer processing. Note that the central processor may be implemented in any suitable manner such as a microcontroller, microprocessor, microcomputer, ASIC core, FPGA core, central processing unit (CPU) or digital signal processor (DSP) or any other computing means.

The edge ports and network ports may be implemented on one or more line interface cards that provide the PHY interface to bidirectional communication links, in addition to the MAC interface. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

The network device also comprises an optional user interface adapted to respond to user inputs and provide feedback and other status information. A host interface 216 enables communication with a user or host computing device 214. The host may be adapted to configure, control and maintain the operation of the device. The device may also comprise magnetic storage device means for storing application programs and data.

The network device comprises computer readable storage medium for storing program code and data which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the clock distribution unit and/or CES receiver module of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform mechanisms and methods of the present invention or any portion thereof may also reside, in whole or in part, in the static or dynamic main memories or in firmware within the processor of the switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The invention claimed is:

1. A system for distributing a master clock source over an asynchronous Ethernet transport network, comprising:
 a clock distribution unit comprising:
  a clock distribution transmitter operative to generate network timestamps derived from said master clock source and to insert said network timestamps and a clock quality indication into clock synchronization packets comprising modified Ethernet packets, said clock quality indication adapted to convey a measure of the quality of said master clock source;
  a distributor operative to transmit said modified Ethernet packets to a plurality of circuit emulation service (CES) modules connected to said network;
 each CES module comprising:
  a receiver operative to receive said modified Ethernet packets, extract said network timestamp therefrom;
  a digital time delay loop (DTLL) operative to generate a local timestamp utilizing a reconstructed clock generated by a local clock source, to initially apply quick coarse filtering followed by application of slow fine filtering to time differences between said local timestamps and said received network timestamps to generate a clock control signal thereby, and to correct the frequency of said reconstructed clock in accordance with said clock control signal, said DTLL operative to implement a closed loop tracking system whereby an equilibrium point is achieved comprising a constant value of network timestamp minus local timestamp and any deviations in the equilibrium point are corrected by said DTLL;

wherein said clock control signal is generated based on only the difference between two timestamps comprising said network timestamps sent when said clock synchronization packet are transmitted by said transmitter and said local timestamps generated when said clock synchronization packets are received at said receiver.

2. The system according to claim 1, wherein said clock synchronization packets do not comprise a Time Division Multiplexing (TDM) payload.

3. The system according to claim 1, wherein the clocks in all CES modules receiving said clock synchronization packets are synchronized to said master clock source.

4. The system according to claim 1, wherein said clock distribution transmitter is further operative to transmit a clock quality indication via said clock synchronization packets to said CES modules to indicate the quality of said master clock source.

5. The system according to claim 1, wherein said receiver is further operative to extract a clock quality indication sent by said clock distribution unit and to compare said clock quality indication to a threshold.

6. The system according to claim 1, wherein said DTLL further comprises a holdover circuit operative to generate said reconstructed clock utilizing a last synchronized frequency when clock synchronization packets are not received.

7. A method of distributing a master clock source to a plurality of circuit emulation service (CES) modules over an asynchronous Ethernet transport network, said method comprising the steps of:

receiving clock synchronization packets comprising modified Ethernet packets sent from a clock distribution unit and extracting network timestamps and a clock quality indication therefrom, wherein said network timestamps and clock quality indication are derived from said master clock source and distributed via modified Ethernet packets over said network to said plurality of CES modules;

generating local timestamps utilizing a reconstructed clock generated by a local clock source;

coarse filtering differences between said local timestamps and said network timestamps to generate a clock control signal in a digital time locked loop (DTLL);

fine filtering differences between said local timestamps and said network timestamps to generate a fine tuning clock control signal once said DTLL achieves lock using said coarse filtering;

generating said reconstructed clock in accordance with said fine tuning clock control signal;

wherein a DTLL implements a closed loop tracking system whereby an equilibrium point is achieved comprising a constant value of network timestamp minus local timestamp and any deviations in the equilibrium point are corrected by said DTLL; and wherein said liner tuning clock control signal is generated based on only the difference between two timestamps comprising said network timestamp sent when said clock synchronization packet is transmitted and said local timestamp generated when said clock synchronization packet arrives at a receiver.

8. The method according to claim 7, wherein said clock synchronization packets do not comprise a Time Division Multiplexing (TDM) payload.

9. The method according to claim 7, wherein the clocks in all CES modules receiving said clock synchronization packets are synchronized to said master clock source.

10. The method according to claim 7, further comprising the step of transmitting a clock quality indication via said clock synchronization packets to indicate the quality of said master clock source.

11. The method according to claim 7, further comprising the step of extracting a clock quality indication sent by a clock distribution unit and comparing said clock quality indication to a threshold.

12. The method according to claim 7, further comprising a holdover step of generating said reconstructed clock utilizing a last synchronized frequency when clock synchronization packets are not received.

13. A method of distributing a clock from a clock distribution unit to a plurality of circuit emulation service (CES) modules over an asynchronous Ethernet transport based network, said method comprising the steps of:

generating first network timestamps from a primary master clock source at said clock distribution unit;

establishing first connections for carrying clock synchronization traffic from said clock distribution unit to said plurality of CES modules;

transmitting first clock synchronization packets comprising modified Ethernet packets incorporating said first network timestamp and a first clock quality indication over said first connections to said plurality of CES modules to be synchronized, said clock quality indication adapted to convey a measure of the quality of said primary master clock source;

generating second network timestamps from a backup master clock source;

establishing second connections for carrying clock synchronization traffic from said clock distribution unit to said plurality of CES modules;

transmitting second clock synchronization packets comprising modified Ethernet packets incorporating said second network timestamps and a second clock quality indication over said second connections to said plurality of CES modules to be synchronized, said second clock quality indication adapted to convey a measure of the quality of said backup master clock source;

wherein said first clock quality indication and said second clock quality indication are used to select between first and second network timestamps at each CES module;

wherein a closed loop tracking system is implemented at said plurality of CES modules whereby an equilibrium point is achieved comprising a constant value of network timestamp minus local timestamp and any deviations in the equilibrium point are corrected by said closed loop tracing system; and wherein a clock control signal is generated at said plurality of CES modules based on only the difference between two timestamps comprising said network timestamps sent when clock synchronization packets are sent and local timestamps generated when said clock synchronization packets arrive at said CES modules.

14. The method according to claim 13, wherein said clock synchronization packets do not comprise a Time Division Multiplexing (TDM) payload.

15. The method according to claim 13, wherein said step of transmitting first clock synchronization packets and said step of transmitting second clock synchronization packets comprises the step of utilizing a Time Division Multiplexing (TDM) demultiplexer for distributing clock synchronization packets to a plurality of T1 circuits, each T1 circuit connected to a CES module.

16. The method according to claim 13, wherein said step of transmitting first clock synchronization packets and said step of transmitting second clock synchronization packets comprise the step of distributing clock synchronization packets to said CES modules over a plurality of point-to-point connections.

17. The method according to claim 13, wherein said step of transmitting first clock synchronization packets and said step of transmitting second clock synchronization packets comprise the step of distributing clock synchronization packets to said CES modules over a point-to-multipoint connection.

18. The method according to claim 13, wherein said step of transmitting first clock synchronization packets and said step of transmitting second clock synchronization packets comprise the step of distributing clock synchronization packets to said CES modules over a combination of point-to-multipoint and point-to-point connections.

19. The method according to claim 13, further comprising the step of transmitting a sequence number for use in handling packets received out of sequence.

20. The method according to claim 13, further comprising the step of transmitting a clock quality indication to said CES modules to indicate the quality of a respective master clock source.

21. The method according to claim 13, wherein said method implemented in an Application Specific Integrated Circuit (ASIC).

22. The method according to claim 13, wherein said method implemented in a Field Programmable Gate Array (FPGA).

23. A system for synchronizing a plurality of circuit emulation service (CES) modules over an asynchronous Ethernet transport network, comprising:
    a primary clock distribution unit comprising:
        first clock distribution transmitter operative to generate first network timestamps derived from a primary master clock source and to insert said first network timestamps and a first clock quality indication into clock synchronization packets comprising first modified Ethernet packets;
        a first distributor operative to transmit first modified Ethernet packets containing said first network timestamp and said first clock quality indication to said plurality of circuit emulation service (CES) modules over said network;
    a backup clock distribution unit comprising:
        second clock distribution transmitter operative to generate second network timestamps derived from a backup master clock source and to insert said network timestamps and a second clock quality indication into clock synchronization packets comprising second modified Ethernet packets;
        a second distributer operative to transmit second modified Ethernet packets containing said second network timestamp and second clock quality indication to said plurality of circuit emulation service (CES) modules over said network;
    each CES module comprising:
        a first receiver operative to receive said first modified Ethernet packets and extract said first network timestamp and said first clock quality indication therefrom;
        a second receiver operative to receive said second modified Ethernet packets and extract said second network timestamp and said second clock quality indication therefrom;
        a clock source selector operative to select either said first network timestamp or said second network timestamp in accordance with said first clock quality indication and said second clock quality indication; and
        a digital time delay loop (DTLL) operative to generate a local timestamp utilizing a reconstructed clock generated by a local clock source, to initially apply quick coarse filtering followed by application of slow fine filtering to time differences between said local timestamps and either said received first or second network timestamps to generate a clock control signal thereby, and to correct the frequency of said reconstructed clock in accordance with said clock control signal, said DTLL operative to implement a closed loop tracking system whereby an equilibrium point is achieved comprising a constant value of network timestamp minus local timestamp and any deviations in the equilibrium point are corrected by said DTLL; and
    wherein said clock control signal is generated based on only the difference between two timestamps comprising said network timestamps sent when said clock synchronization packets are transmitted and said local timestamp generated when said clock synchronization packet are received by a CES module.

24. The system according to claim 23, wherein said first clock synchronization packets and said second clock synchronization packets do not include a Time Division Multiplexing (TDM) payload.

25. The system according to claim 23, wherein each CES module further comprises switchover means for adapting the local timestamp to a newly received timestamp such that said clock generator retains synchronization with network timestamps received from said backup clock distribution unit in the event said primary clock distribution unit fails.

26. The system according to claim 23, wherein each CES module further comprises holdover means for generating said reconstructed clock utilizing a last synchronized frequency when clock synchronization packets are not received.

27. A circuit emulation services (CES) module, comprising:
    a first receiver operative to receive, over an asynchronous Ethernet network, first clock synchronization packets comprising first modified Ethernet packets from a primary clock distribution unit coupled to a primary master clock source and extract a first network timestamp and first clock quality indication therefrom, said first clock quality indication adapted to convey a measure of the quality of said primary master clock source;
    a second receiver operative to receive, over said Ethernet network, second clock synchronization packets comprising second modified Ethernet packets from a backup clock distribution unit coupled to a backup master clock source and extracting a second network timestamp and second clock quality indication therefrom, said second clock quality indication adapted to convey a measure of the quality of said backup master clock source;
    a clock source selector operative to select a preferred network timestamp based on said first clock quality indication and said second clock quality indication;
    a digital time delay loop (DTLL) operative to generate a local timestamp utilizing a reconstructed clock generated by a local clock source, to initially apply quick coarse filtering followed by application of slow fine filtering to time differences between said local timestamp and either said received first or second network timestamps to generate a clock control signal thereby, and to correct the frequency of said reconstructed clock in accordance with said clock control signal, said DTLL operative to implement a closed loop tracking system whereby an equilibrium point is achieved comprising a constant value of network timestamp minus local timestamp and any deviations in the equilibrium point are corrected by said DTLL; and wherein said clock control signal is generated based on only the difference between two timestamps comprising said network timestamp sent when said clock synchronization packets are sent by a clock distribution unit and said local timestamp generated when clock synchronization packets arrive at a receiver.

28. The module according to claim 27, wherein said first clock synchronization packets and said second clock synchronization packets do not include a Time Division Multiplexing (TDM) payload.

29. The system according to claim 27, wherein the clocks in all CES modules receiving said first clock synchronization packets and said second clock synchronization packets are synchronized to either said primary master clock source or said backup master clock source.

30. The system according to claim 27, further comprising switchover means for adapting the local timestamp to a newly received timestamp such that said clock generator retains synchronization with network timestamps received from said backup clock distribution unit in the event said primary clock distribution unit fails.

31. The system according to claim 27, further comprising holdover means for generating said reconstructed clock utilizing a last synchronized frequency when clock synchronization packets are not received.

32. The module according to claim 27, implemented in an Application Specific Integrated Circuit (ASIC).

33. The module according to claim 27, implemented in a Field Programmable Gate Array (FPGA).

34. An edge switch for use in an asynchronous Ethernet transport based network, comprising:
 a plurality of user ports for interfacing said edge switch to one or more users;
 a plurality of network ports for interfacing said edge switch to one or ore communication links;
 a packet processor comprising ingress packet processing means and egress packet processing means;
 a circuit emulation services (CES) module for centralized clock distribution over said network, said CES module comprising:
  a first clock distribution transmitter operative to generate first network timestamps derived from a primary master clock source and to insert said first network timestamps and a first clock quality indication into clock synchronization packets comprising first modified Ethernet packets;
  a first distributor operative to establish first connections to a plurality of CES modules over said network, and to transmit said first modified Ethernet packets over said first connections to said plurality of CES modules;
  a second clock distribution transmitter operative to generate second network timestamps derived from a backup master clock source and to insert said second network timestamps and a second clock quality indication into clock synchronization packets comprising second modified Ethernet packets;
  a second distributor operative to establish second connections to said plurality of CES modules over said network, and to transmit said second modified Ethernet packets over said second connections to said plurality of CES modules;
  wherein said first clock quality indication and said second clock quality indication are used to select between first and second network timestamps;
  a digital time delay loop (DTLL) operative to implement a closed loop tracking system whereby an equilibrium point is achieved comprising a constant value of network timestamp minus local timestamp and any deviations in the equilibrium point are corrected by said DTLL; and wherein a clock control signal is generated at said CES modules based on only the difference between two timestamps comprising network timestamps sent when clock synchronization packets are sent by a distributor and local timestamps generated when clock synchronization packets are received by said CES modules.

35. The switch according to claim 34, wherein said first clock synchronization packets and said second clock synchronization packets do not include a Time Division Multiplexing (TDM) payload.

36. An edge switch for use in an asynchronous Ethernet transport network, comprising:
 a plurality of user ports for interfacing said edge switch to one or more users;
 a plurality of network ports for interfacing said edge switch to one or more communication links;
 a packet processor comprising ingress packet processing means and egress packet processing means;
 a circuit emulation services (CES) module comprising:
  a first receiver operative to receive, over an asynchronous Ethernet network, first clock synchronization packets comprising first modified Ethernet packets from a primary clock distribution unit coupled to a primary master clock source and to extract a first network timestamp and first clock quality indication therefrom, said first clock quality indication adapted to convey a measure of the quality of said primary master clock source;
  a second receiver operative to receive, over said Ethernet network, second clock synchronization packets comprising second modified Ethernet packets from a backup clock distribution unit coupled to a backup master clock source and to extract a second network timestamp and second clock quality indication therefrom, said second clock quality indication adapted to convey a measure of the quality of said backup master clock source;
  a clock source selector operative to select either said first or second network timestamps based on said first clock quality indication and said second clock quality indication; and
  a digital time delay loop (DTLL) operative to generate a local timestamp utilizing a reconstructed clock generated by a local clock source, to initially apply quick coarse filtering following by application of slow fine filtering to time differences between said local timestamps and said selected network timestamps to generate a clock control signal thereby, and to correct the frequency of said reconstructed clock in accordance with said clock control signal, said DTLL operative to implement a closed loop tracking system whereby an equilibrium point is achieved comprising a constant value of network timestamp minus local timestamp and any deviations in the equilibrium point are corrected by said DTLL; and wherein said clock control signal is generated based on only the difference between two timestamps comprising network timestamps sent when clock synchronization packets are sent by a clock distribution unit and local timestamps generated when clock synchronization packets arrive at a receiver.

37. The switch according to claim 36, wherein said first clock synchronization packets and said second clock synchronization packets do not include a Time Division Multiplexing (TDM) payload.

38. The switch according to claim 36, further comprising switchover means for adapting the local timestamp to a newly received timestamp such that said clock generator retains synchronization with network timestamps received from said backup clock distribution unit in the event said primary clock distribution unit fails.

39. The switch according to claim 36, further comprising holdover means for generating said reconstructed clock utilizing a last synchronized frequency in the event clock synchronization packets are not received.

40. A method of distributing a master clock source to a plurality of circuit emulation service (CES) modules over an asynchronous Ethernet transport network, said method comprising the steps of:

receiving network timestamps and a clock quality indication encapsulated in modified Ethernet packets sent from a centralized clock distribution entity over said network, said network timestamps and clock quality indication derived from said master clock source;

generating local timestamps utilizing a reconstructed clock generated by a local clock source, a local timestamp generated for each received network timestamp;

generating said reconstructed clock based only on the relative time differences between said network timestamps and said local timestamps;

wherein coarse filtering is applied initially to said relative time differences in order to quickly acquire said reconstructed clock to a predetermined accuracy;

wherein fine filtering is applied subsequently to said relative time differences in order to achieve slow fine-tuning of said reconstructed clock; and wherein a closed loop tracking system is implemented whereby an equilibrium point is achieved comprising a constant value of network timestamp minus local timestamp and any deviations in the equilibrium point are corrected by said closed loop tracking system.

41. The method according to claim 40, wherein said step of coarse filtering comprises minimizing the mean square error of said relative time differences.

42. The method according to claim 40, wherein said step of fine filtering comprises applying infinite impulse response filtering to said relative time differences.

* * * * *